US007558578B1

(12) United States Patent
De Beer

(10) Patent No.: US 7,558,578 B1
(45) Date of Patent: Jul. 7, 2009

(54) APPARATUS AND METHOD FOR ROUTING COMMUNICATIONS

(75) Inventor: Leon De Beer, Newbury (GB)

(73) Assignee: Interoute Communications Limited, London (GB)

( * ) Notice: Subject to any disclaimer, the term of this patent is extended or adjusted under 35 U.S.C. 154(b) by 0 days.

(21) Appl. No.: 09/869,295

(22) PCT Filed: Jan. 18, 2000

(86) PCT No.: PCT/GB00/00114

§ 371 (c)(1),
(2), (4) Date: Jul. 18, 2001

(87) PCT Pub. No.: WO00/41486

PCT Pub. Date: Jul. 20, 2000

(30) Foreign Application Priority Data

Jan. 18, 1999 (GB) .................................. 9901036

(51) Int. Cl.
*H04Q 7/00* (2006.01)
(52) U.S. Cl. .................... 455/445; 455/406; 379/221.02
(58) Field of Classification Search ................ 455/445, 455/552.1, 553.1, 450, 452, 513, 455, 435.1, 455/406, 405, 414.1, 1; 370/351, 354, 389, 370/352; 379/114.01, 114.02, 114.1, 219, 379/220.01, 221.01–221.07, 414.01, 414.02
See application file for complete search history.

(56) References Cited

U.S. PATENT DOCUMENTS

| 5,155,860 | A | 10/1992 | McClure |
| 5,301,359 | A | 4/1994 | Van den Heuvel et al. |
| 5,515,425 | A | 5/1996 | Penzias et al. |
| 5,550,915 | A | 8/1996 | Partridge, III |
| 5,638,433 | A | 6/1997 | Bubien, Jr. et al. |

(Continued)

FOREIGN PATENT DOCUMENTS

EP 0 724 371 7/1996

(Continued)

OTHER PUBLICATIONS

C. Erlandson, et al., Ericsson Review, No. 4, pp. 150-153, "WAP—The Wireless Application Protocol", 1998.

(Continued)

*Primary Examiner*—George Eng
*Assistant Examiner*—Khawar Iqbal
(74) *Attorney, Agent, or Firm*—Oblon, Spivak, McClelland, Maier & Neustadt, P.C.

(57) ABSTRACT

A mobile telephone is provided with a look-up table enabling the mobile telephone to select preferred routes for connecting outgoing calls on the basis of predetermined codes which populate the look-up table. When operating in a cellular communications network a communications channel may thereby be selected from a plurality of available channels and ongoing transmission of an outgoing call may be routed via a further network selected in accordance with the route codes. The look-up table may be stored in a SIM card of the mobile telephone and may be updated via transmission of data from a remote control center via a cellular network or via a docking station to which the mobile telephone is releasably connectable. When the call is routed via a packet switching network, the routing code may include a string of network node addresses.

80 Claims, 22 Drawing Sheets

U.S. PATENT DOCUMENTS

| | | | |
|---|---|---|---|
| 5,719,931 A | 2/1998 | Johnson | |
| 5,764,741 A | 6/1998 | Barak | |
| 5,781,620 A | 7/1998 | Montgomery et al. | |
| 5,937,351 A * | 8/1999 | Seekins et al. | 455/434 |
| 5,983,092 A * | 11/1999 | Whinnett et al. | 455/406 |
| 6,014,546 A * | 1/2000 | Georges et al. | 725/79 |
| 6,101,379 A * | 8/2000 | Rahman et al. | 455/406 |
| 6,122,263 A * | 9/2000 | Dahlin et al. | 370/329 |
| 6,125,282 A * | 9/2000 | Urabe | 455/552.1 |
| 6,138,010 A * | 10/2000 | Rabe et al. | 455/426.1 |
| 6,151,500 A * | 11/2000 | Cardina et al. | 455/435.2 |
| 6,169,791 B1 * | 1/2001 | Pokress | 379/114.02 |
| 6,185,413 B1 * | 2/2001 | Mueller et al. | 455/405 |
| 6,223,037 B1 * | 4/2001 | Parkkila | 455/434 |
| 6,253,088 B1 * | 6/2001 | Wenk et al. | 455/462 |
| 6,366,560 B1 * | 4/2002 | Ohiwane et al. | 370/238 |
| 6,427,076 B2 * | 7/2002 | Skog | 455/433 |
| 6,466,802 B1 * | 10/2002 | Blakeney et al. | 455/552.1 |
| 6,516,192 B1 * | 2/2003 | Spaur et al. | 455/450 |
| 6,657,989 B1 * | 12/2003 | Hilsenrath | 370/351 |

FOREIGN PATENT DOCUMENTS

| | | |
|---|---|---|
| EP | 724371 A1 * | 7/1996 |
| EP | 1 207 702 | 5/2002 |
| FR | 2 763 462 | 11/1998 |
| GB | 2 292 046 | 2/1996 |
| GB | 2 298 335 | 8/1996 |
| GB | 2 310 344 | 8/1997 |
| GB | 2 328 117 | 2/1999 |
| WO | WO 97/44976 | 11/1997 |
| WO | WO 98/32288 | 7/1998 |
| WO | WO 98/40990 | 9/1998 |
| WO | WO 98/58512 | 12/1998 |
| WO | WO 99/04578 | 1/1999 |
| WO | WO 99/53621 | 10/1999 |

OTHER PUBLICATIONS

A. Fasbender, et al., IEEE Personal Communications, vol. 6, No. 2, pp. 22-30, "Any Network, Any Terminal, Anywhere", Apr. 1999.

A. Seneviratne, et al., Computer Communications, vol. 21, No. 4, pp. 1244-1255, "Cellular Networks and Mobile Internet", Sep. 15, 1998.

* cited by examiner

INITIATING AN OUTGOING CALL

MOBILE TELEPHONE WITH ROUTING LUT IN SIM CARD

STRUCTURE OF LUT

Fig 14 — MOBILE PHONE WITH DOCKING STATION FOR CABLE NETWORK UPDATING OF LUT

MOBILE PHONE WITH DOCKING STATION FOR
LAND LINE TELEPHONE UPDATING OF LUT

MOBILE PHONE WITH DOCKING STATION FOR LAND LINE TELEPHONE UPDATING

MOBILE PHONE WITH DOCKING STATION HAVING A MODEM FOR LAND LINE TELEPHONE UPDATING OF LUT

PREFIX CODE FOR ROUTING VIA PACKET
SWITCHED NETWORK

ROUTING VIA INTERNET AND UPDATING
LUT VIA WEB PAGES

ROUTING VIA INTEGRATED PACKET SWITCHED NETWORK

APPARATUS AND METHOD FOR ROUTING COMMUNICATIONS

The present invention relates to an apparatus and method for telephone communication from mobile cellular telephones and is particularly concerned with an apparatus and method for routing communication to a call destination along a preferential route.

In recent years many countries have liberalised their telecommunications systems. As a result, when a user operates a telephone, the user increasingly has a choice as to the networks used to carry his message. Each network has typically a different set of characteristics such as geographical extent, speed of transmission, and an associated cost.

Devices are known which automatically route messages along the route of least cost for use with fixed (land line) telephone apparatus. As the route costings of the networks change, the routing information stored in these devices needs to be updated as the least cost route may have changed. This updating is done by sending updated information along the telephone lines to the least cost route device.

The present invention seeks to provide improved facilities for users of mobile cellular telephones. At present, it is normal for such users of mobile cellular telephones to have the facility to register with only a single service provider, with optionally a roaming facility which allows one or more additional service providers to be used from the same mobile telephone. The user however is left to make his own decision as to which service provider to use for a particular call and is required to manually select the service provider and hence the communication channel required for the call.

Further liberalisation of telecommunications systems is anticipated to allow total flexibility in the choice of routing of calls from a mobile telephone, both in terms of the service provider selected for communicating the call as far as a gateway to the public service telephone network and also in the subsequent choice of network connection within the public service telephone network for finally routing the call to the call destination. It is further anticipated that mobile virtual network operators may provide services to users of the system via commercial agreements with the actual operators of the cellular networks.

According to the present invention there is disclosed a method of operating a mobile telephone in a cellular telephone communications system in which a plurality of service providers provide respective alternative communications channels comprising the steps of;

storing routing information in a look-up table of the mobile telephone such that the table is populated with data in the form of preferred route codes, each preferred route code being representative of a preferred route for connection to a respective call destination;

originating an outgoing telephone call by the input of user generated call destination information;

accessing the look-up table using an address determined at least in part by the call destination information to obtain a selected preferred route code;

selecting one of the communication channels in accordance with the preferred route code; and establishing communication for the outgoing telephone call for a call destination corresponding to the call destination information via the selected communication channel of a corresponding selected service provider.

Preferably the look-up table is populated with the results of a route selection decision made by a remote control centre, thereby minimising the processing required by the telephone by arriving at the optimum selection of route. The data in the look-up table is preferably periodically refreshed by updating information which may be communicated to the mobile telephone via the cellular telephone communications system or via a docking station to which the mobile telephone is releasably connectable.

The look-up table in a preferred embodiment is stored in a smart card which also constitutes the SIM card of the mobile telephone and a SIM card containing an initial version of the look-up table may be prepared prior to installation in a mobile telephone.

Further aspects of the present invention are disclosed in the appended claims.

Preferred embodiments of the present invention will now be described by way of example only and with reference to the accompanying drawings of which;

FIG. 1 illustrates schematically the manner in which a mobile telephone 1 is able to make a telephone call to a destination telephone 2 which in this example is connected via land lines to a local exchange 6A. The local exchange 6A is accessible via any one of a number of interconnected conventional (land line) telephone networks 5A, 5B, 5C operated by respective network operators.

Figure 1:
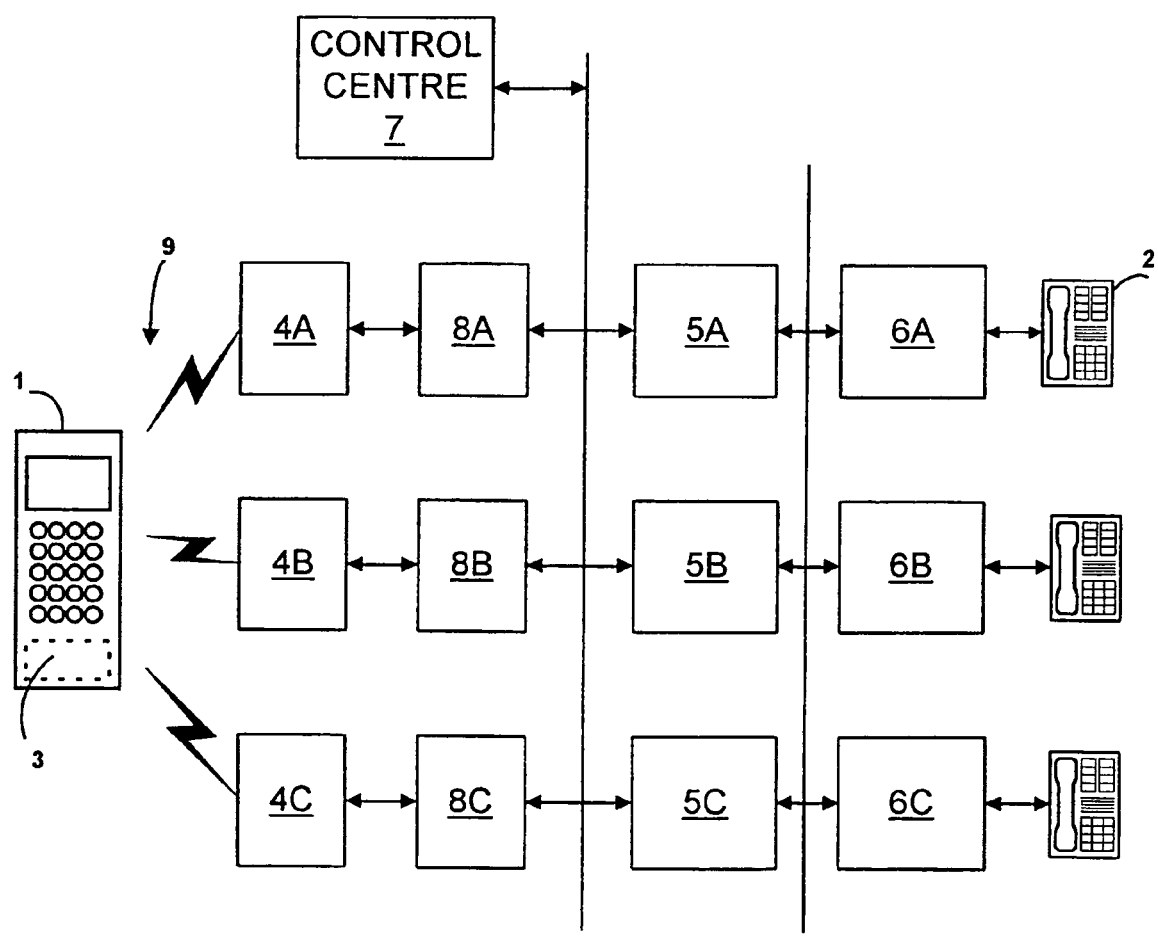
FIG. 1 is a schematic representation of a mobile telephone connected to telephone networks via any one of a plurality of cellular phone service providers.

FIG. 1 illustrates base stations 4A, 4B and 4C of respective cellular mobile telephone networks 8A, 8B and 8C each connected to the conventional telephone networks 5A, 5B and 5C, the base stations being arranged to provide cellular communications over an air interface 9 with mobile telephones in cells local to each base station. In some instances, base stations 4A, 4B, 4C may be physically shared by the mobile telephone networks 8A, 8B, 8C but for the purpose of the present explanation these are represented as distinct base stations at different locations in FIG. 1.

Wireless telemetry communication between the mobile telephone 1 and the cellular telephone service provider base stations 4A, 4B, 4C conforms to conventional protocols in which distinct sets of frequencies are made available to the different service providers.

Each cell of the cellular telephone system will typically define a geographical area within which mobile telephones can operate on any one of a number of frequencies depending upon the selected service provider and the relative reception characteristics of frequencies used by that service provider within the cell. For a given frequency, multiple users are accommodated using data packet multiplexing of digital data. For the purposes of the present description, the term "channel" will be used to refer to the communication facilities provided by a single service provider so that each of the service providers makes available a respective channel for multiple users. Selection of a channel in the present context is therefore equivalent of selection of a mobile telephone network or service provider from a number of available options operating in parallel.

The mobile telephone 1 of the present invention is provided with a least cost routing means 3 enabling the mobile telephone to select, without user intervention, a preferred route for connection to the telephone 2 based on the input by the user of the call destination telephone number. The mobile telephone 1 determines the preferred route with reference to routing information stored in the mobile telephone 1, the selection being made on the basis of call destination and other parameters such as time and calendar data.

A selection of the preferred route firstly entails selection of which of the mobile telephone networks should receive the outgoing call from the telephone 1. For many calls, particularly to destination telephones which themselves are mobile telephones (not shown in FIG. 1), this choice of service provider will uniquely determine the forward routing of the connection to the destination telephone. In other instances, there will remain a number of available options for forward connection from the mobile telephone network 8A of a given service provider to the telephone 2, for example via any one of the (land line) networks 5A, 5B and 5C. The selected route will therefore need to also define in these instances the preferred (land line) network and this is accomplished by additionally prefixing the telephone number dialled by the user with a prefix code stored in memory within the mobile telephone 1.

The mobile telephone networks 8A, 8B, 8C include switching centres which provide a gateway for connection to the land line networks 5A, 5B, 5C and, for calls directed through the gateway, determine routing in accordance with the prefix code.

A control centre 7 is also connected to the telephone networks and is therefore in communication with both the networks 5A, 5B, 5C and the cellular mobile telephone networks 8A, 8B, 8C. The control centre 7 will typically be administered by an entity which is independent of the mobile telephone networks 8A, 8B, 8C and the land line networks 5 and may for example be a virtual network operator. In the following description of preferred embodiments, reference is made to a least cost routing means (LCRM) 3. Such LCRM is to be understood to be an example of a routing device in accordance with the present invention and that, although the predetermined information on which the routing device operates will typically be decided on the basis of least cost routing, the information may equally well be determined on the basis of network availability, level of use of networks, or other factors, or a combination of the above which may be appropriate to particular operating circumstances. It is important to note that the least cost routing means is notionally unaware of the basis on which the routing decision is determined, this decision being conducted remotely therefrom by the control centre 7 and the results of the decisions for each parameter such as call destination being made available in the form of a look-up table.

The cellular telephone service providers and the operators of networks 5A, 5B, 5C send billing information containing details of the caller's telephone number, the called telephone number and the duration of the call, to the control centre 7. The control centre 7 subsequently bills the caller. In this way, rather than receiving separate bills from each of service providers and the operators of the networks 5A, 5B, 5C for each accounting period, a caller receives one bill from the control centre 7 for those calls processed by the control centre. (It is envisaged that some calls may still need to be billed directly by the network to which the user subscribes.) The operator of the control centre 7 pays each service provider and network operator for the time used on its respective network. Such networks may be public or private data networks and may include the Internet. Such networks may therefore include data networks not originally or primarily intended for carrying voice traffic.

The control centre 7 collates costing information to determine the current rates charged by the cellular telephone service providers and network operators for communicating between any two telephones 1, 2 and the least cost route is calculated by the control centre 7 for given time periods. Typically service providers and network operators charge at different rates for different times of the day, there being typically a peak charge time period and an off peak time period, these rates also typically differing according to the day of week. Whenever a change in the cost of using a cellular service or network occurs, the comparison by the control centre 7 between the cost of each route must be repeated in order to revise the decision as to which of the available routes is a least cost route. The results of this decision must then be passed on to the LCRMs 3. In order to update the routing information stored in each LCRM 3, data to which the LCRM 3 refers by addressing a look up table is periodically transmitted to each mobile telephone 1.

The updated least cost route information broadcast by the control centre 7 to each LCRM 3 via at least one of the cellular telephone service providers is preferably encrypted and compressed as a coded signal.

It is envisaged that in accordance with a first embodiment such transmission of updating information to the LCRMs 3 would be made as a multipoint broadcast during periods of minimum or off peak cellular telephone traffic.

Both routing and subsequent billing via the control centre 7 are determined by adding dialling information to the user generated number.

Figure 4:
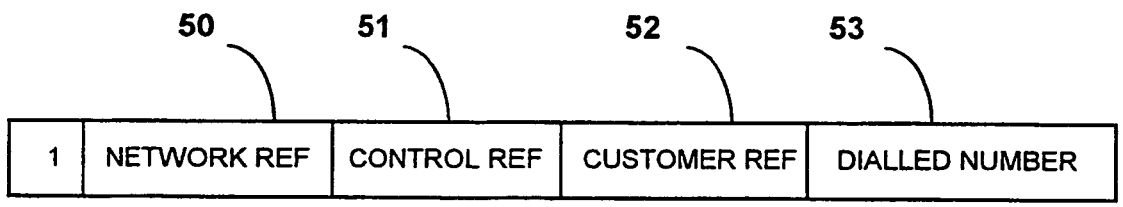
FIG. 4 is a schematic diagram of the telephone number including prefix code added by the routing means.

FIG. 4 illustrates a schematic diagram of the dialling information sent from an LCRM 3 in this embodiment.

The dialling information conforms to the 1xxx standard whereby the first digit sent is "1" followed by a number "XXX" (network reference 50) which identify one of the networks 5A, 5B, 5C through which the call is to be routed. A charging information field is then transmitted which includes a control reference number 51 which indicates to the appropriate network service provider that the operator of the control centre 7 needs to be billed for the cost of the call. A customer identification field including customer reference number 52 is then sent which is forwarded to the control centre 7 so that the operator of the control centre may bill the user of the telephone 1. Finally the user generated dialled number 53 is transmitted.

In this embodiment, the mobile telephone 1 forms part of the GSM network in which a service named Cell Broadcast is utilised to send short messages to all mobile telephones in a given geographical area as a multipoint broadcast message.

Figure 2:
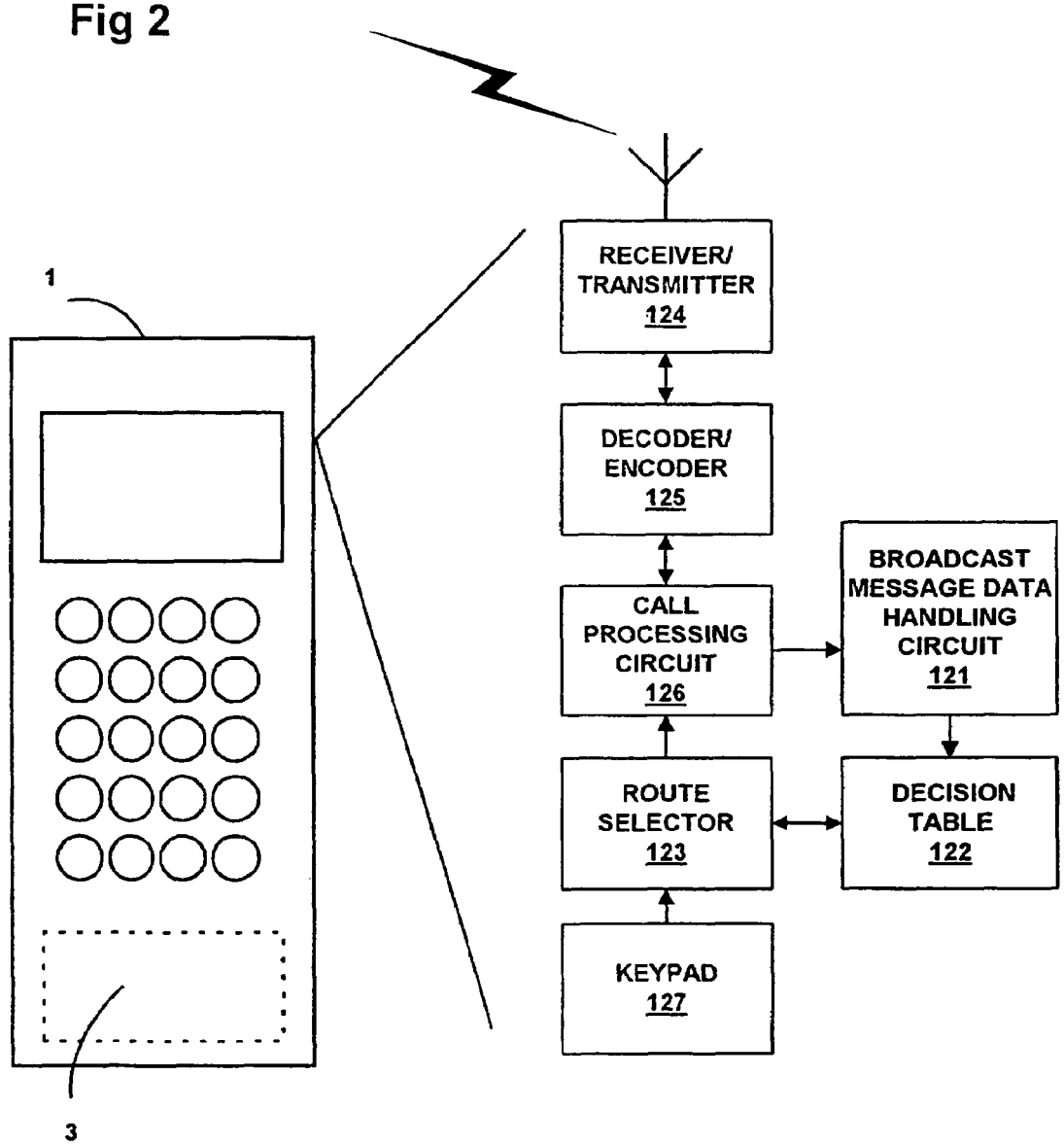
FIG. 2 is a schematic representation of the functional elements of the mobile telephone of FIG. 1.

In the example of FIG. 2, the Cell Broadcast service is used to send updating information for updating the least cost route tables stored in the mobile telephone 1. This is illustrated schematically in the right hand portion of FIG. 2 which illustrates that the message data handling circuit 121 of the mobile telephone 1 is used to input data to a decision table 122 corresponding functionally to the LCRM tables 134 and 135 described below with reference to FIG. 3. A keypad 127 allows the user to input a dialled number. The processor of the mobile telephone 1 includes a route selector 123 which refers to the decision table 122 before processing a user input call destination to determine the channel to be used for the outgoing call to a selected service provider and to enable an appropriate prefix to be added to the user dialled number. A transmitter and receiver circuit 124 is provided for transmitting and receiving transmissions of telephone calls and to receive the Cell Broadcast message data input to the message data handling circuit 121. A decoder and encoder circuit 125 and a call processing circuit 126 provide an interface between the transmitter and receiver circuit 124 and both the route selector 123 and the message handling circuit 121.

Further embodiments will now be described using corresponding reference numbers for corresponding features where appropriate.

Figure 3:
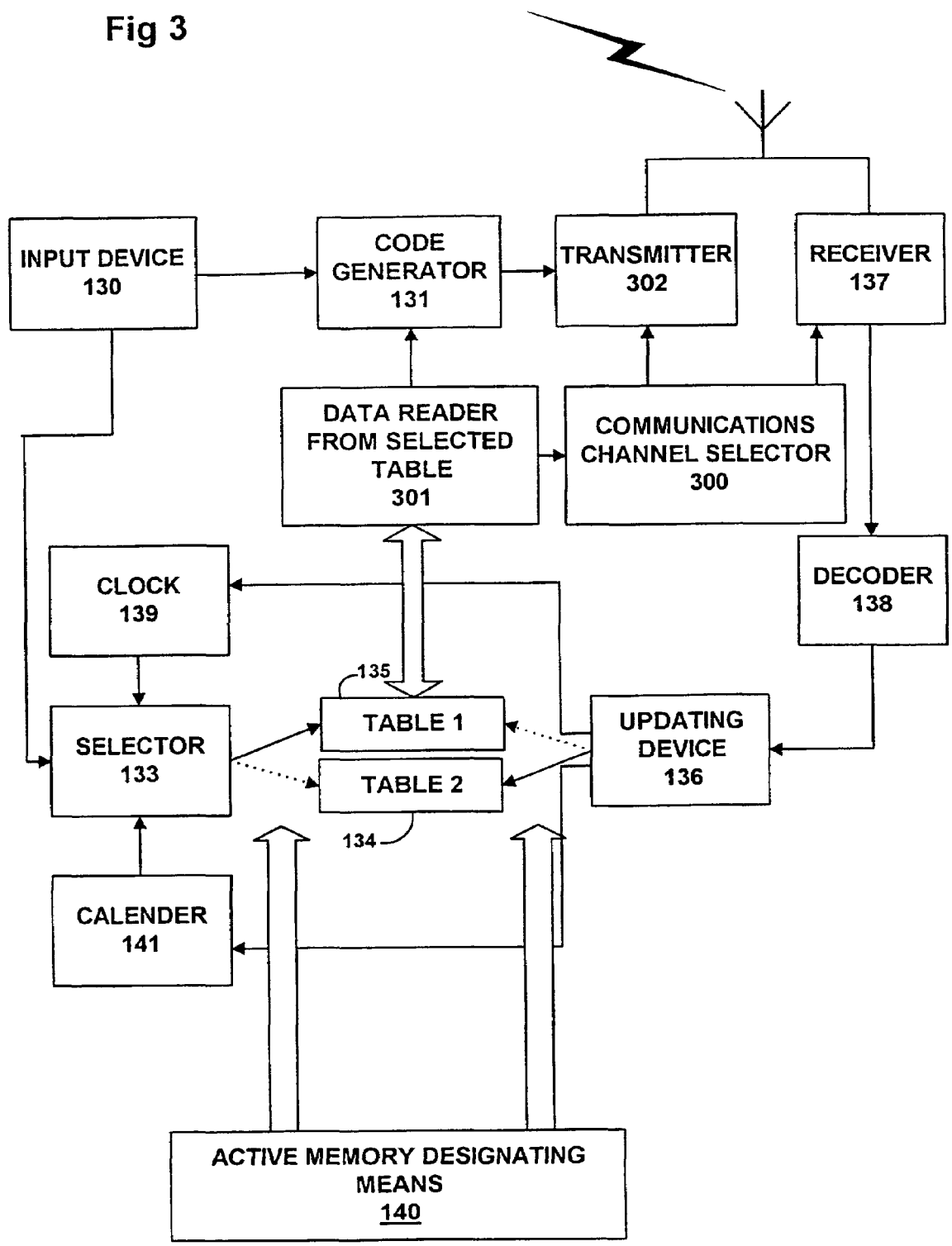
FIG. 3 is a schematic representation of the functional elements of the mobile telephone of FIG. 1 showing detail of the selection of look-up table information.

FIG. 3 illustrates schematically an example of a mobile telephone 1 having routing means having decision tables referred to below as look-up tables 134, 135. An input device in the form of a keypad 130 generates an input signal representative of a user generated call number which defines the user selected call destination. Routing information is obtained by accessing the look-up tables 134 and 135, only one of which is currently designated as being active by an active memory designating means 140. The active memory is designated according to which of the tables 134 and 135 was last updated, thereby leaving an inactive memory to await the receipt of further updating information, following receipt of which it will then become the active memory.

As shown schematically in FIG. 3, an updating device 136 is available to update Table 2, the currently inactive memory, while a selector 133 is available to select routing information from Table 1, the currently active memory, in dependence upon the data input to the selector 133 from the input device 130. In this way, a user generated call destination in the form of a dialled telephone number is used by the selector 133 to generate an address for accessing the memory of the currently active look-up table. Data is read from the address by a data reader 301 and input to a communications channel selector 300 and a code generator 131.

The communications channel selector 300 selects a communications channel to be used for wireless communication between the mobile telephone 1 and a base station 4A of the system and is connected to the transmitter 302 and receiver 137 to allow setting of the appropriate channel frequency and protocol for communication.

The code generator 131 prefixes the input signal with a prefix signal which is representative of a selected prefix code defining the preferred (land line) network connection route and including other data relating to customer identification and charging as illustrated in FIG. 4.

Although the selector 133 locates the required routing information primarily in response to an input from the input device 130 of the destination call number, the address information also includes time period data and day of the week data from a calendar 141. The updating device 136, which updates whichever of the decision tables 134 and 135 is currently inactive, receives updating information from the receiver 137 and a decoder 138.

A clock 139 and the calendar 141 are also updated by the received broadcast information via the receiver 137 for providing the additional address information for the selector 133 in addressing the look up tables 134 and 135.

The routing information may be updated at any time but would preferably be updated either at regular intervals, preferably between one day and one month, or whenever the preferential routing information changes.

Figure 5:
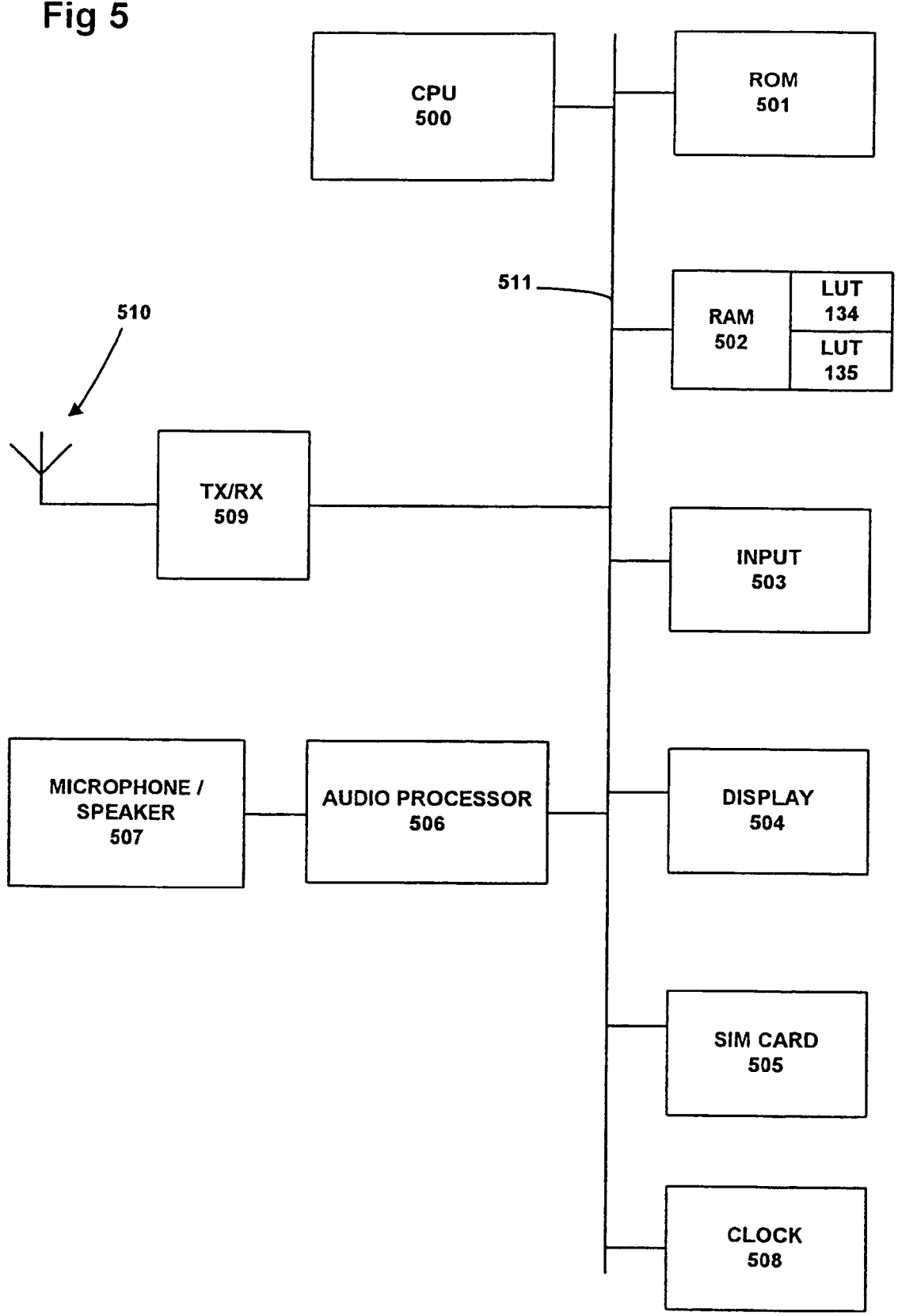
FIG. 5 is a schematic diagram of a further embodiment of a telephone operated under software control by a processor.

FIG. 5 illustrates a further embodiment of a mobile telephone in which a processor 500 controls operation of the various sub-units of the telephone by software implementation. As shown schematically in FIG. 5, the processor 500 is connected via a databus 511 to a read only memory 501, a random access memory 502, a data input 503 in the form of a keypad and a display 504 in the form of a liquid crystal display. A SIM (Subscriber Identity Module) card 505 is also connected to the databus 511 and contains identifying information which is unique to the telephone and user.

Also connected to the databus 511 is an audio processor 506 connected to a microphone and speaker circuit 507. The databus 511 is also connected to transmitter and receiver circuits 509 connected to an antenna 510.

The random access memory 502 includes look-up tables 134 and 135 corresponding to the tables described above with reference to FIG. 3, the tables being accessed in a similar manner, except that the functions of the selector 133, clock 139, calender 141, data reader 301, and communications channel selector 300 of FIG. 3 are performed in the embodiment of FIG. 5 by the processor 500 and associated circuits described above.

Conventional mobile telephones are generally capable of being registered to a single mobile telephone service provider, even though the telephone includes circuitry which is capable of registering the telephone with any one of a plurality of available service providers. The process of registration which is performed each time the telephone is switched on or moves into an area falling within an active cell of the communications system involves transmission of an identification code stored in the SIM card 505 to the service provider. The service provider registers the identification information and allocates facilities including a communications channel for received calls to be routed to the telephone and for outgoing calls to be made via the service provider.

Figure 6:
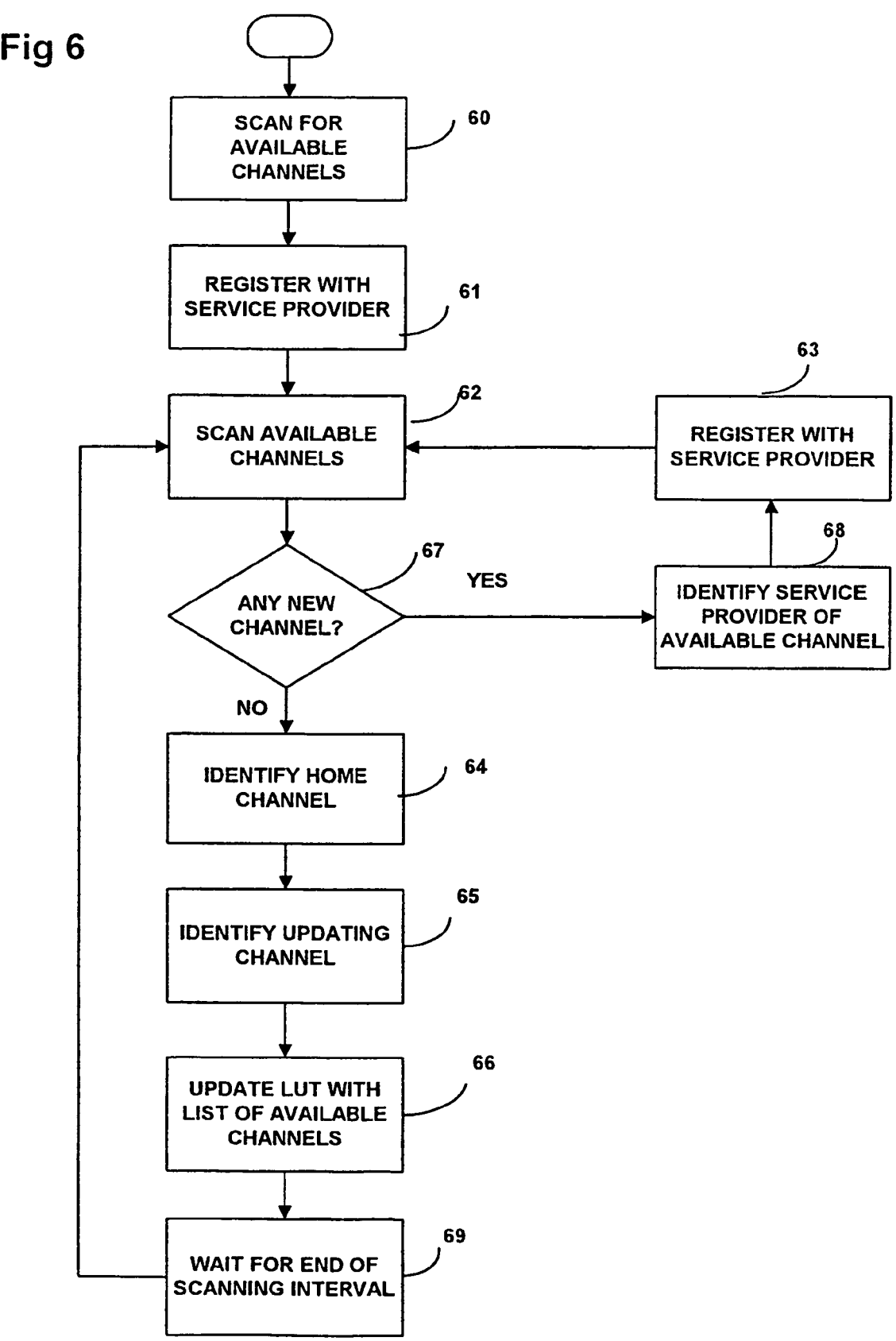
FIG. 6 is a flow chart illustrating operation of the telephone of FIG. 5.

Mobile telephones in accordance with the present invention perform this registration procedure as shown in FIG. 6 by first scanning at step 60 available communication channels for which it has functional capability in order to obtain information on which service providers have channels currently available. When a service provider of an available channel is identified in this manner, the telephone attempts at step 61 to complete registration over the appropriate communication channel. On completion, the telephone then scans at step 62 to locate any further service providers and, if any new channel is found at step 67, identifies the service provider at step 68 and completes registration in turn at step 63 so that the telephone will be simultaneously registered with a plurality of service providers. In order to complete this task, it may be necessary for the SIM card 505 to contain a plurality of respective identification codes appropriate to the requirements of the different service providers.

This process of scanning available communication channels, typically on different operating frequencies, is repeated at scanning intervals of several minutes in order to maintain an up-to-date list of available service providers with which the telephone is registered. Typically this will require operating at a plurality of different frequencies to access the channels of the respective service providers.

Figure 8:
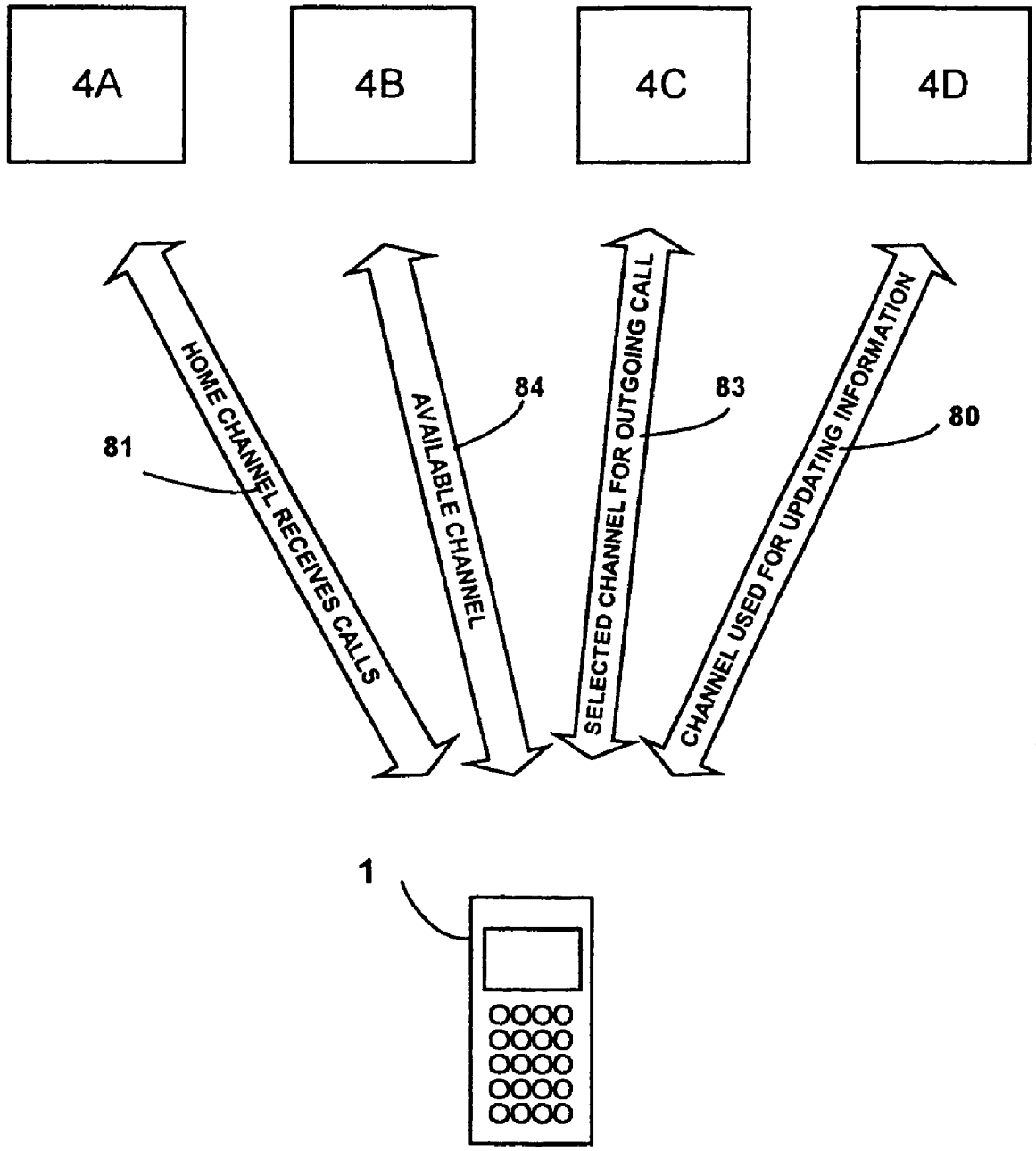
FIG. 8 is a schematic diagram showing available channels for use by a mobile telephone.

At step 64 the telephone 1 elects one particular service provider to provide a "home" channel 81 as illustrated in FIG. 8 for receiving incoming telephone calls to the telephone so that the home channel thereafter requires continuous monitoring by the telephone. Operation of the transmitter and receiver circuits 509 to additionally perform scanning and registration therefore requires the capability to operate simultaneously at two different frequencies or to switch rapidly from one frequency to another so that any incoming call signals are not missed on the home channel 81.

When, as part of the ongoing monitoring procedure, a service provider is newly identified as having an operating frequency which is usable within the current cell, the telephone 1 transmits a message to the newly found service provider to indicate the presence of the telephone and include the identification information contained in the SIM card 505. After an authentication procedure is performed by the service provider in order to confirm that the user of the telephone is validly authorised for use of the service, a communication channel facility is established between the telephone and the service provider. The telephone 1 then requests from the service provider an indication of whether least cost routing information is to be broadcast by this service provider and received in the newly opened communications channel. In this way the processor 500 is able to maintain a running check on the identity of the service provider forwarding received (incoming) messages to the telephone and to identify at step 65 which of the available service providers will be sending the updating information for the look-up tables 134 and 135. In the example of FIG. 8, service provider base station 4D provides a channel 80 used for updating information and service provider base station 4A provides the "home" channel 81 for received calls. (FIG. 8 also illustrates a selected channel 83 for outgoing calls and a further channel 84 which is currently available for selection.)

Having identified the service provider which will be forwarding the updating information for the look-up tables, the mobile telephone 1 requests from the service provider information defining the frequency with which the telephone should forward a request for updating information to the service provider. When this information is received, the processor 500 sets in progress a routine such that a request for updating information is automatically generated by the telephone 1 and communicated to the responsible service provider (base station 4D) at the required interval. In response to such a request, updating information is communicated via the communications channel 80 to the telephone 1 and stored in whichever of the look-up tables 134 and 135 is currently inactive, following a procedure analogous to the procedure described above with reference to the embodiment of FIG. 3.

In this way, updating information can continue to be received and stored in the inactive table while routing information is being simultaneously extracted from the currently active table on demand.

To deal with the eventuality that more than one of the acquired service providers indicates that it is available to provide updating information, or more than one service provider indicates that it is to forward incoming messages, the CPU 500 is provided with a routine for arbitrating to elect only one such service provider in each instance, as appropriate.

At step 66, the look-up table is updated to include a current list of those channels which are available before waiting at step 69 for the end of a scanning interval before beginning to repeat the channel scanning process of steps 62, 63, 67 and 68. The look-up table includes a carrier availability table for this purpose, as described below with reference to FIG. 11.

The broadcast of updating information to the mobile telephone 1 may be effected using the SMS (short message service) facility which is available in a number of cellular telephone networks.

A point to multipoint broadcast is available using SMS, thereby enabling a large number of mobile telephones in a given area to be simultaneously updated, or rather all of those telephones in the area which are turned on and able to receive the broadcast signal at the time of transmission. Alternatively, a group broadcast may be made to a group of users. If a message is not received by a given user, a message centre stores the message for a predefined period to enable the updating information to be downloaded at the next instance of registration of the user in the network.

A further alternative is that the updating information could be transmitted using point to point broadcast to each destination.

According to a further modified embodiment, the updating information additionally includes identification information providing authorization for use with additional service providers. This is appropriate in instances where the telephone SIM card contains only identification information providing authorization for use of a single service provider, or an incomplete set of service providers where additional service providers are in fact available for operation.

The provision of this additional identification information then facilitates registration of the telephone with all available service providers.

Figure 7:
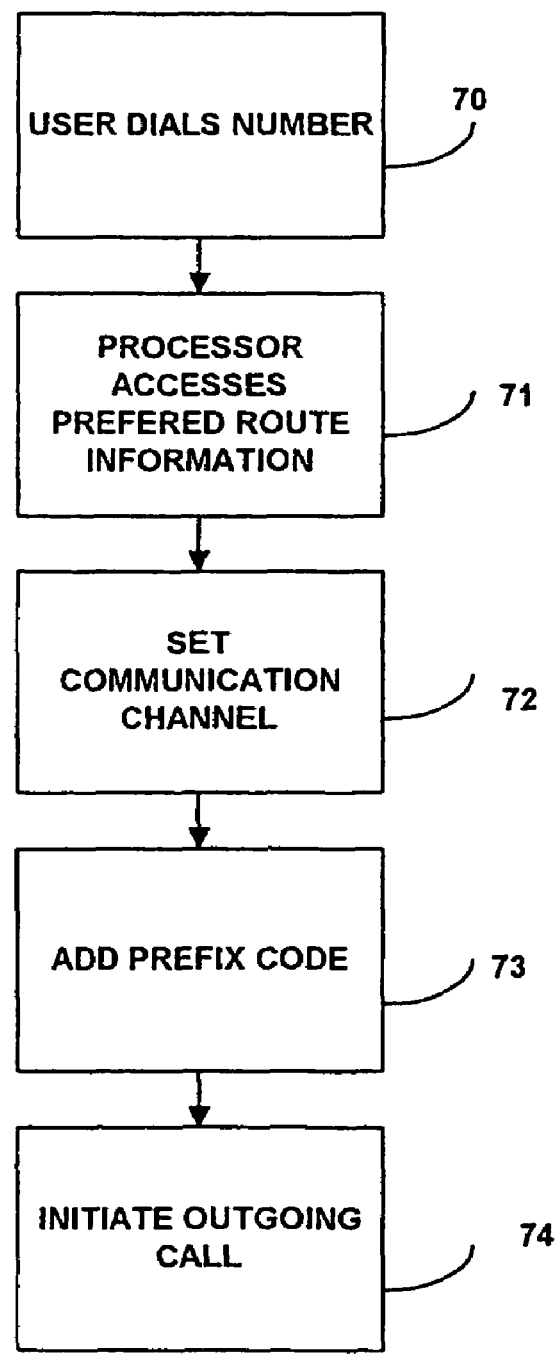
FIG. 7 is a flow chart illustrating the process of initiating an outgoing call.

In use as shown in FIG. 7, a user of the telephone 1 initiates at step 70 an outgoing call by inputting a telephone number corresponding to a desired call destination using the keypad input 503 of FIG. 5. The processor 500 determines from the RAM 502 which of the look-up tables 134 and 135 is currently designated as being active and generates an address of the look-up table corresponding to the user generated call number, the current time indicated by clock 508 and other parameters for which the processor is programmed to utilise in address generation. The preferred route information is read at step 71 from the selected look-up table and utilised to determine at step 72 the selected channel for operation of the transmitter and receiver circuits 509 which are then instructed accordingly by the processor 500, setting the required frequency and communications protocol.

The prefix code is added to the dialled number at step 73 and the call is initiated at step 74 for transmission by the transmitter circuit 509 to the base station 4C of the service provider of the selected channel 83.

As shown in FIG. 1, the base station 4A of the selected service provider receives the transmission and establishes forward connection to the call destination telephone 2 via whichever of the networks 5A, 5B and 5C is indicated in accordance with the preferred route information.

Connection is established between the telephone 1 and the call destination 2 and the telephone call proceeds.

Billing information is collated by the control centre 7 for subsequent payment of the telephone user and payment to the service provider and selected network.

In this way, routing information determined on a least cost basis enables the user of the mobile telephone to maximise efficiency in making calls over several networks.

In the event that the preferred route information cannot be successfully utilised because one or other of the service provider channels or networks is unavailable, a second choice is read from the look-up table and connection again attempted. If this second choice route also fails, a default connection mode is adopted in which connection is made using the home channel 81 to a service provider who then has responsibility for determining the route for forward connection to the destination 2.

Optionally, a prefix number may be added at step 73 to the user generated telephone number, including the information referred to above with reference to FIG. 4.

According to a further alternative embodiment, the processor 500 would be programmed to provide for registration only with a single service provider. At the point of selection of the preferred route and preferred service provider for cellular communication, the mobile telephone 1 would then, if the preferred route indicates a service provider other than the presently registered service provider, initiate registration with the preferred service provider in the manner indicated above. On completion of registration, the routing of the telephone call then proceeds by selecting the preferred communication channel and adding the prefix code to the dialled number input by the user to the keypad input 503.

If however registration at this point is not possible, for example because a lack of signal strength means that the communications channel of the service provider selected is not in fact available, the processor 500 is programmed to repeat the selection process to access a second choice route. If no preferred route can be accessed, the processor 500 is programmed to adopt a default route which uses the communication channel of the already registered service provider.

The above described embodiments utilise two look-up tables 134 and 135 in order to allow one look-up table to be ready for use while the other is being updated.

Alternatively, a single look-up table may be utilised and the timing of the updating operation controlled by the processor 500 such that conflict does not occur between the updating of the look-up table and the process of accessing the look-up table to obtain routing information.

The option of having a single look-up table may be applied to each of the above described embodiments, an implementation of a single look-up table circuit being described below by way of example with reference to FIG. 9.

Figure 9:
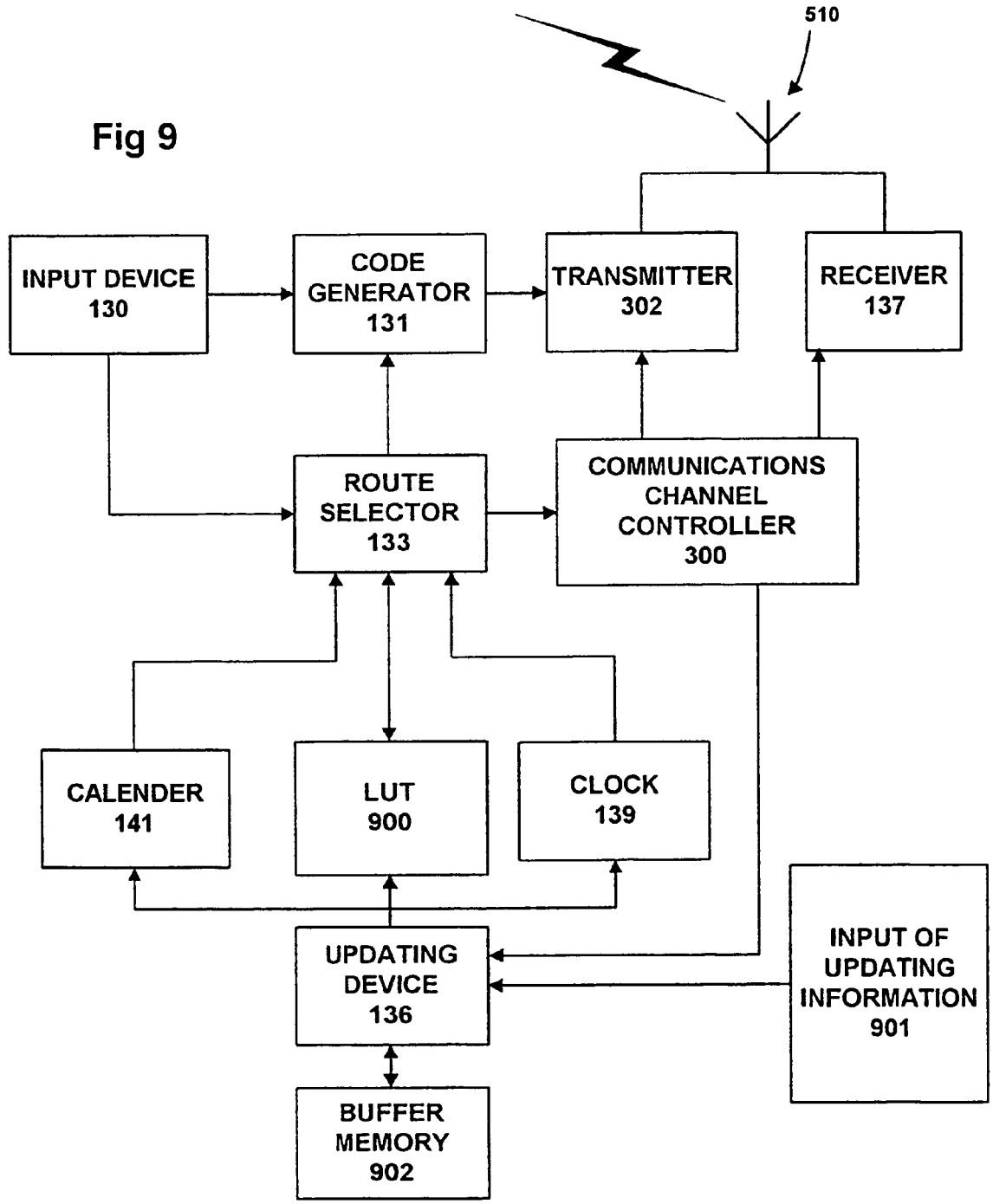
FIG. 9 is a schematic representation of an alternative mobile telephone having a single look-up table.

FIG. 9 illustrates schematically the circuit of a mobile telephone using corresponding reference numbers to those of preceding figures for corresponding elements where appropriate and further including a single look-up table 900.

An updating device 136 is arranged to update the information in the look-up table 900 by overwriting existing entries in the look-up table with updating information for the corresponding address whenever blocks of updating information are received from an input 901 of updating information.

Typically the entire contents of the look-up table 900 will not be transmitted in a single burst, the contents being instead divided into blocks transmitted over time.

Each block may contain information for refreshing data at a number of addresses and this data may be buffered in a buffer memory 902 the updating device 136 during the updating procedure.

The route selector 133 obtains information from the look-up table by addressing specific information, the look-up table 900 being controlled such that read and write operations do not occur simultaneously.

As shown in FIG. 9, the updating device 136 is also arranged to refresh the information stored in the calendar 141 and clock 139 in order to avoid the effects of drift of the internal clock of the mobile telephone.

The input 901 of updating information is represented only schematically in FIG. 9 and may be constituted by the decoder 138 of FIG. 3 cooperating with the receiver 137 (not shown in FIG. 9) to receive packets of data in a wireless broadcast. Alternatively, the input of updating information may comprise a connection to a docking station (not shown in FIG. 9) as described below with reference to FIGS. 13 to 16.

The input of updating information 901 also receives information identifying which cellular networks are currently available for selection to provide communication channels, the information being obtained as described above with reference to FIG. 6.

The input of updating information 901 may further receive information originating from networks such as networks 5A, 5B and 5C in FIG. 1 which may initiate the broadcast of messages concerning their current performance or availability.

In the above described embodiments, the single look-up table 900, or where appropriate the first and second look-up tables 134 and 135, are stored as part of the random access memory 502.

Figure 10:
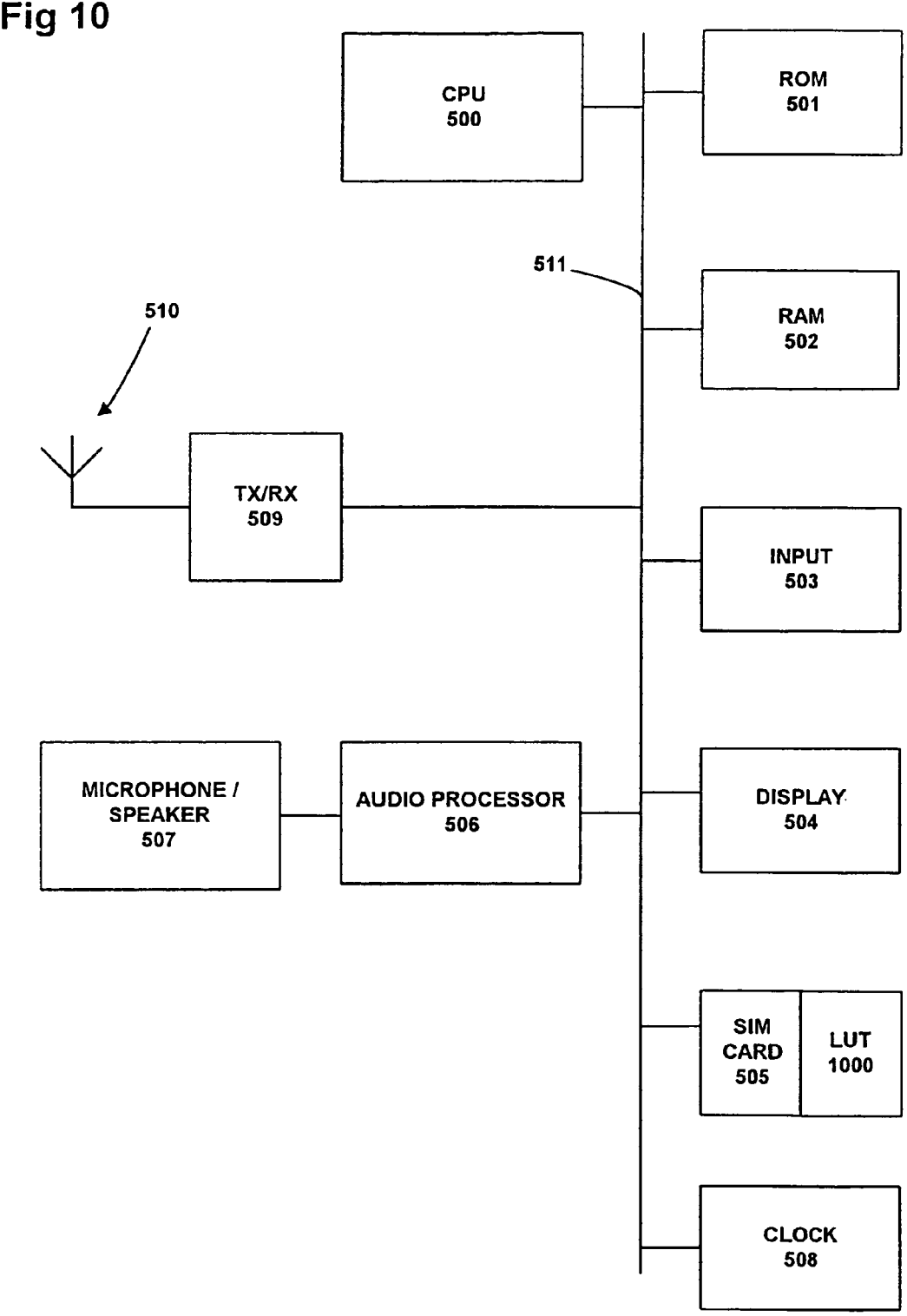
FIG. 10 is a schematic diagram of a further mobile telephone having a routing table stored in a SIM card.

Alternatively, the look-up table information may be stored within the SIM card 505 as illustrated schematically in FIG. 10.

In the embodiment of FIG. 10, the SIM card 505, in m addition to storing the personal information normally stored in the SIM card regarding the user for registration purposes etc, stores the look-up table 1000. The mobile telephone of FIG. 10 therefore accesses the look-up table 1000 by reading information addressed to the SIM card 505 and updating of look-up table 1000 is effected by writing to the appropriate address in the SIM card 505. Functionally, the mobile telephone of FIG. 10 performs otherwise in an equivalent manner to the mobile telephone described above with reference to FIG. 9.

The SIM card utilised in the embodiment of FIG. 10 has a memory of 1 Mbyte capacity, this capacity being sufficient to accommodate the normal requirements of memory in the SIM card and approximately 10 Kbytes of data constituting the look-up table 1000. It is commonplace for the SIM card to be supplied separately from the main body of the mobile telephone and for the SIM card to be inserted into the mobile telephone at the point of sale. It is therefore envisaged that in accordance with the present invention a SIM card should be prepared for such installation so as to already include a look-up table populated with data of the type described below with reference to the tables 1100, 1101, 1102 and 1103 of FIG. 11. Similarly, a user who acquires a new mobile telephone may transfer his existing SIM card to the new mobile telephone, the look-up table 1000 then already being populated with data at the point of installation into the mobile telephone. Once the new mobile telephone is used, updating information may then be received to bring the data up to date. The SIM card 505 in a preferred embodiment is programmed with the look-up table data and related applications by the control centre 7 and supplied for use with mobile telephones, either by being pre-installed in mobile telephones or installed at the point of sale.

Figure 11:
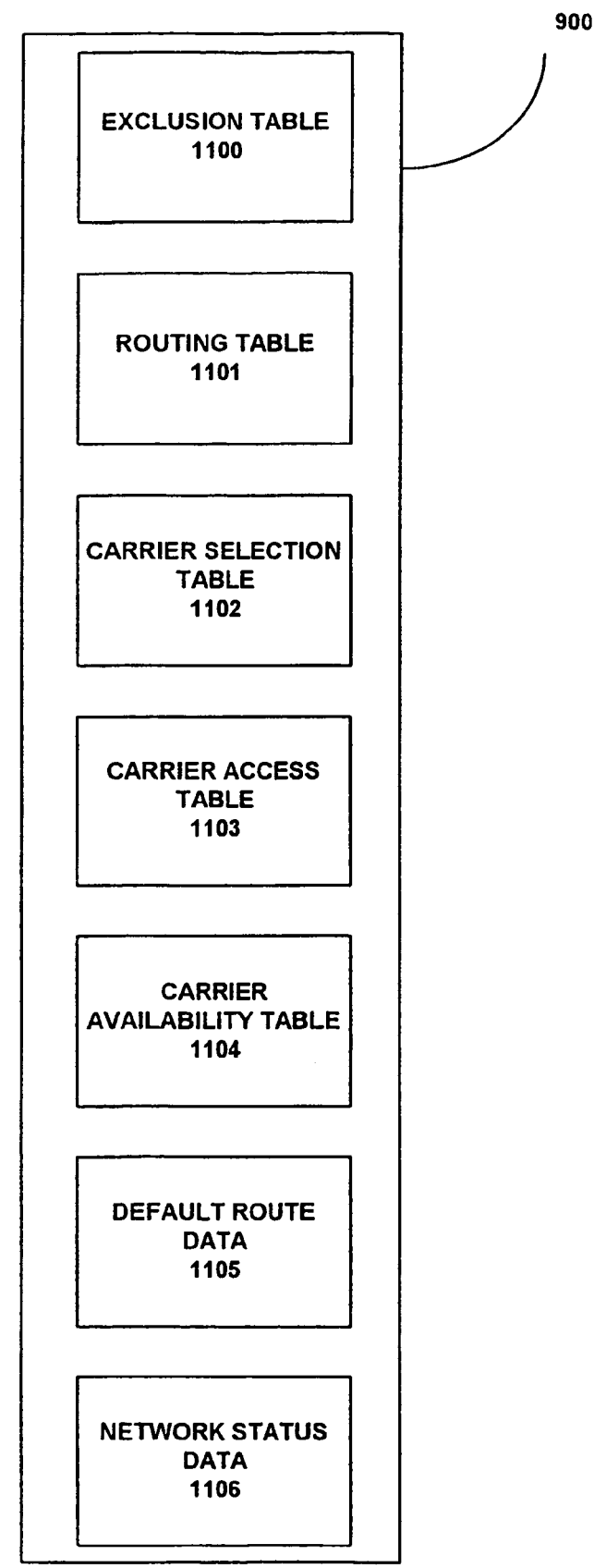
FIG. 11 is a schematic diagram illustrating the structure of the look-up table of FIG. 10.

FIG. 11 illustrates the structure of the look-up table 900, being equivalent to the look-up table 1000 of FIG. 10 and each of the look-up tables 134 and 135 of FIG. 3.

In FIG. 11, the look-up table 900 is seen to comprise an exclusion table 1100 which contains details of those call destinations which are excluded from the least cost routing function. The look-up table 900 further comprises a routing table 1101 which is a look-up table containing preferred route codes representative of preferred routes via one or more networks corresponding to each destination.

The look-up table 900 also includes a carrier selection table 1102 providing, for each preferred route code, a list of carrier selections in order of preference such that alternative carrier selections are defined if the first choice cannot be used due to the required channel being unavailable. For each channel selection, channel selection data is stored.

The look-up table 900 further includes a carrier access table 1103 to convert the channel selection data obtained from table 1102 into actual prefix codes to be added to the dialled number and actual channel selection data for controlling the channel selector 300 of FIG. 9.

The look-up table 900 also includes a carrier availability table 1104 which is updated to include information as to which channels are currently available to the mobile telephone 1 using data obtained by the communications channel controller 901 of FIG. 9.

The look-up table 900 also includes default route data 1105 to be used in the event that the normal routing function is not fulfilled by the data available in tables 1101 to 1104. The default route data may include a default prefix code to be added to the user dialled number in order to route the call via a predetermined network or service provider.

Finally, the look-up table 900 also includes network status data 1106 comprising status information received from broadcasts originating not from the control centre 7 but from networks over which calls may be routed. Such networks, for example networks 5A to 5C in FIG. 1, may broadcast status messages in the event that network performance is temporarily degraded or in instances where the network is totally unavailable.

Figure 12:
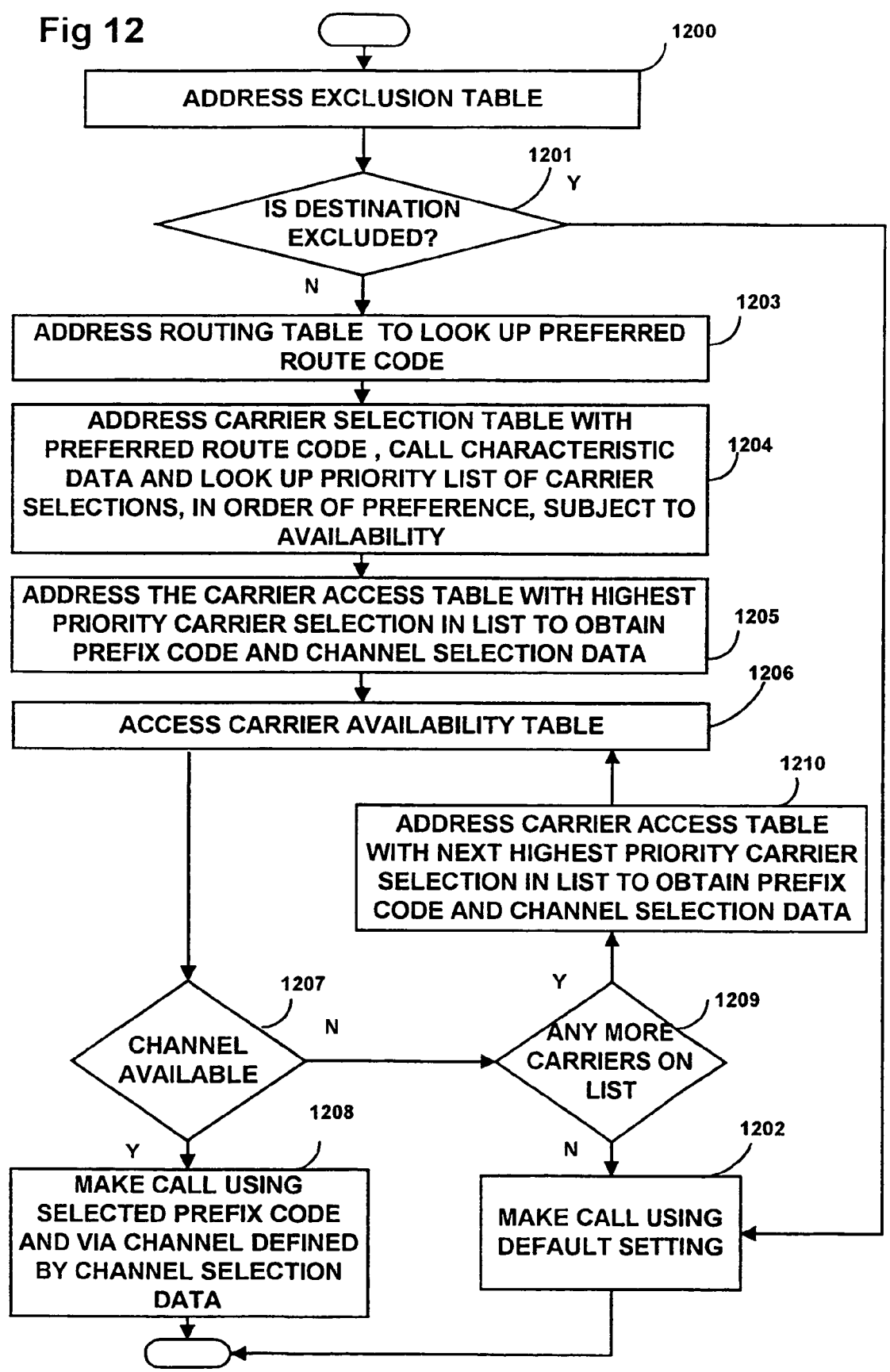
FIG. 12 is a flow chart illustrating use of the look-up table of FIG. 11.

FIG. 12 illustrates the manner in which the look-up table is addressed. Although FIG. 12 is described with specific reference to the embodiment of FIGS. 10 and 11, the method utilised in FIG. 12 may equally well be applied to each of the preceding embodiments.

At step 1200, the processor 500 addresses the exclusion table 1100 using the call destination telephone number dialled by the user to determine an address in the exclusion table in order to read information indicating whether the call destination is excluded from the least cost routing procedure. The processor 500 at step 1201 determines from this information whether the call destination is excluded and if so, the call is made directly at step 1202 without using the routing procedure, the home channel 81 being utilised and the call destination number dialled without insertion of any prefix.

If however the call destination is determined not to be excluded at step 1201, the processor proceeds to step 1203 of addressing the routing table to look-up a preferred route code.

Each preferred route code is a pointer for indicating the preferred carrier, ie. service provider for the cellular network connection, and the network selection for onward routing such as via land line telephone network. The preferred route code is therefore a code constituting an address for addressing the carrier selection table 1102 at a next step 1204, the processor in this step addressing the carrier selection table with the preferred route code in combination with call characteristic data in order to look-up a priority list of carrier selections to be used in routing the call in order of preference and subject to availability. The call characteristic data consists of those characteristics of the call such as time and date of initiating the call for which the carrier selection table includes a corresponding variable. Additional parameters included in the call characteristic data include the country location from which the call originates, for example whether the call originates in the United Kingdom or France, and the type of communications signal for which the call is primarily intended. Such signals may for example include voice signals, image signals using a facsimile protocol, or alpha-numeric data in various forms including Internet protocols used for email and web pages. A knowledge of the type of data may be derived by recognising those dialled numbers which correspond to modems or Internet service providers for example. The country location may be derived from information obtained during registration since the network ID of each network found may be compared with a network ID list held in the SIM card 505 and which includes country information.

The processor 500 then takes the carrier having the highest priority in this list and, at step 1205, addresses the carrier access table 1103 to obtain the prefix code and channel selection data.

At step 1206, the processor 500 then accesses the carrier availability table 1104 to determine whether the channel identified by the channel selection data is one of the available channels. If at step 1207 the processor determines that the channel is in fact available, and that the selected route is not precluded by an adverse indication from accessing the network status data 1106, the processor at step 1208 implements the making of the outgoing call, adding the selected prefix code to the user dialled number and using the mobile telephone network of the service provider with whom registration was made for the selected channel.

If however at step 1207 the channel identified by the channel selection data is determined not to be available, the processor 500 determines at step 1209 whether any further carriers remain on the list and, if the answer is yes, the processor at step 1210 addresses the carrier access table with the next highest priority carrier selection in the list obtained from step 1205.

Control then returns to step 1206 and, if the channel is available, the call is made at step 1208.

If however none of the selected channels are determined to be available and at step 1209 it is determined that there are no further carriers on the list, control passes to step 1202, at which the processor implements the making of the call without using a default setting. The default setting may use the default data 1105 to route the call using the home channel 81 and for subsequent routing of the call to be made in accordance with the user dialled call destination number. Alternatively, the default setting may require insertion of a prefix code of a predetermined service provider. The default setting enables the mobile telephone to continue to function under adverse conditions such as a lack of available channels or when the tables 1101 to 1104 do not contain sufficient routing information.

Figure 13:
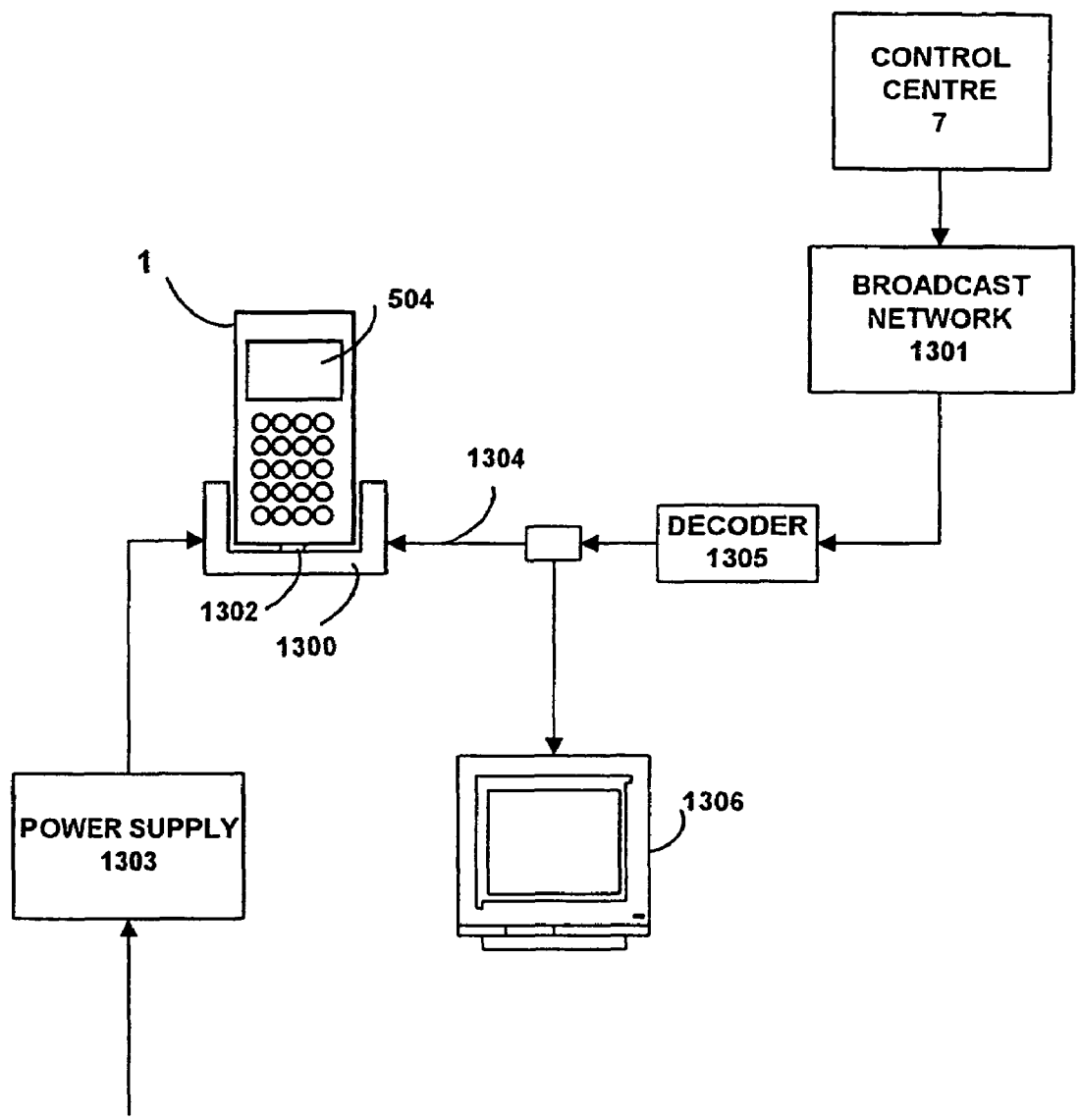
FIG. 13 is a schematic diagram of a further alternative mobile telephone having a docking station for receiving updating data from a cable network.

FIG. 13 illustrates a further embodiment of a mobile telephone 1 in accordance with the present invention in which the input of updating information 901 of FIG. 9 is constituted by a docking station 1300 enabling the mobile telephone to receive updating information transmitted over a land line network, described by way of example as a cable network 1301.

The mobile telephone 1 of FIG. 13 is shown detachably connected to a docking station 1300 which includes a connector 1302 of the type conventionally provided for use with such mobile telephones. The connector 1302 provides multiple contacts enabling data communication and also enabling a recharging power supply 1303 to be connected to the mobile telephone to facilitate charging of the internal battery 1400 shown in FIG. 14. The docking station 1300 is in this example in the form of a cradle which supports the mobile telephone during both charging and data transfer in a position in which the display 504 is visible to the user and the telephone may be available on standby to make and receive calls.

The docking station 1300 receives a data input 1304 obtained from a decoder 1305 which converts optical cable signals into electrical signals. For convenience, the updating signal contained in the input 1304 is multiplexed with a television signal for a television receiver 1306 which receives cable television channels via the decoder 1305 from the network 1301.

Figure 14:
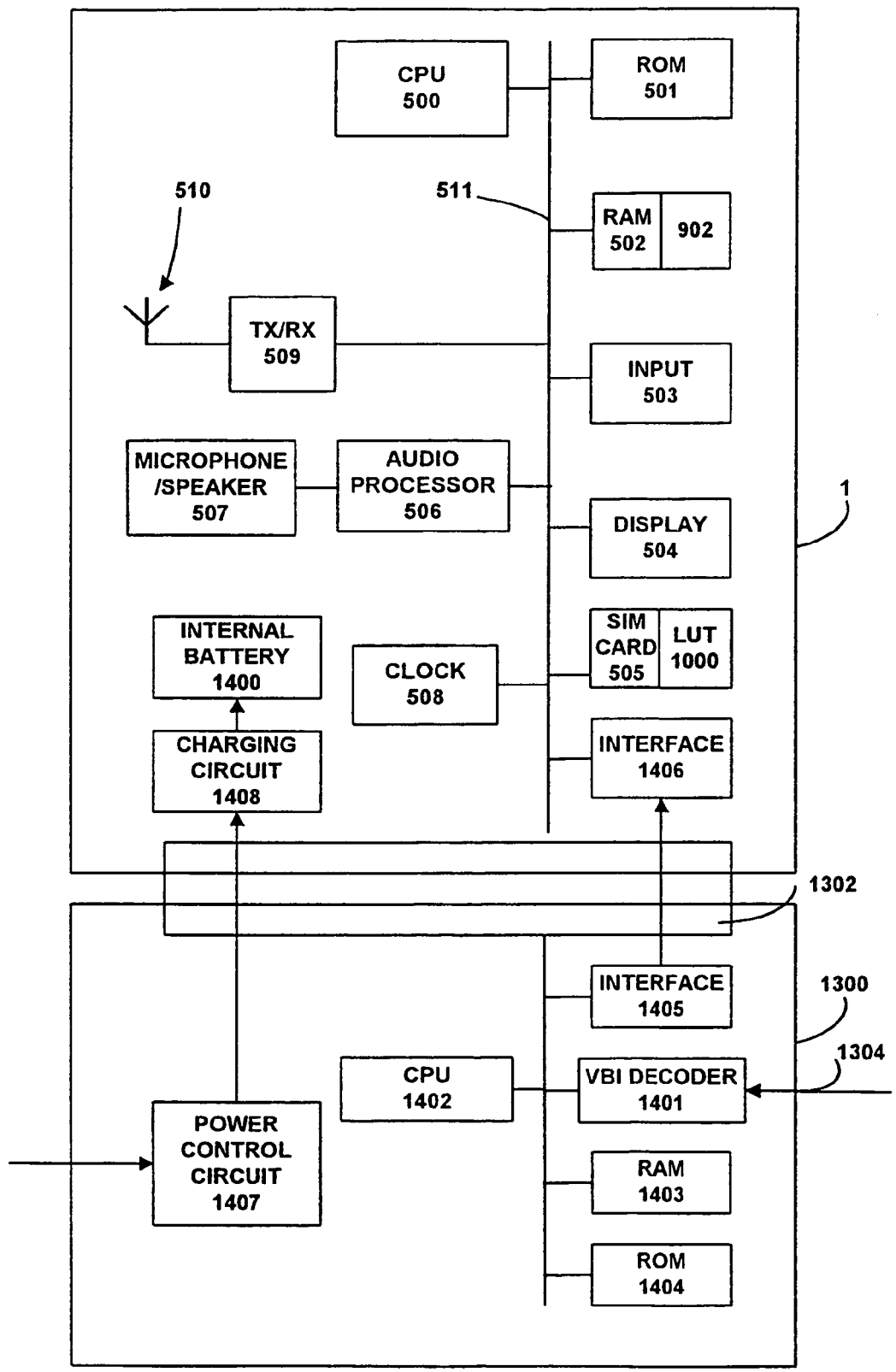
FIG. 14 is a schematic diagram illustrating circuit details of the mobile telephone of FIG. 13.

The data is encoded in the vertical blanking interval of the television signal of one of the received television channels and decoded in a VBI (vertical blanking interval) decoder 1401 as shown in FIG. 14. FIG. 14 illustrates schematically the circuits of both the mobile telephone 1 of FIG. 13 and the docking station 1300, using corresponding reference numerals to those of preceding figures where appropriate for corresponding elements.

The docking station 1300 includes its own CPU 1402 together with associated RAM 1403 and ROM 1404 and an interface 1405 which facilitates data communication with a cooperating interface 1406 in the mobile telephone 1. Connection between interfaces and 1405 and 1406 is made via the connector 1302.

The connector 1302 also communicates charging current from a power control circuit 1407 of the docking station 1300 to a charging circuit 1408 of the mobile telephone 1 enabling the internal battery 1400 to be recharged in a controlled manner.

The control centre 7 broadcasts a multipoint updating signal during off-peak use of the data channel provided by the VBI, the data then being decoded and transmitted to the mobile telephone 1 for updating of the look-up table 1000. In this example, a single look-up table 1000 is provided, the updating information being buffered in buffer memory 902 within the RAM 502 and used to overwrite data stored in the look-up table on a block by block basis.

Figure 15:
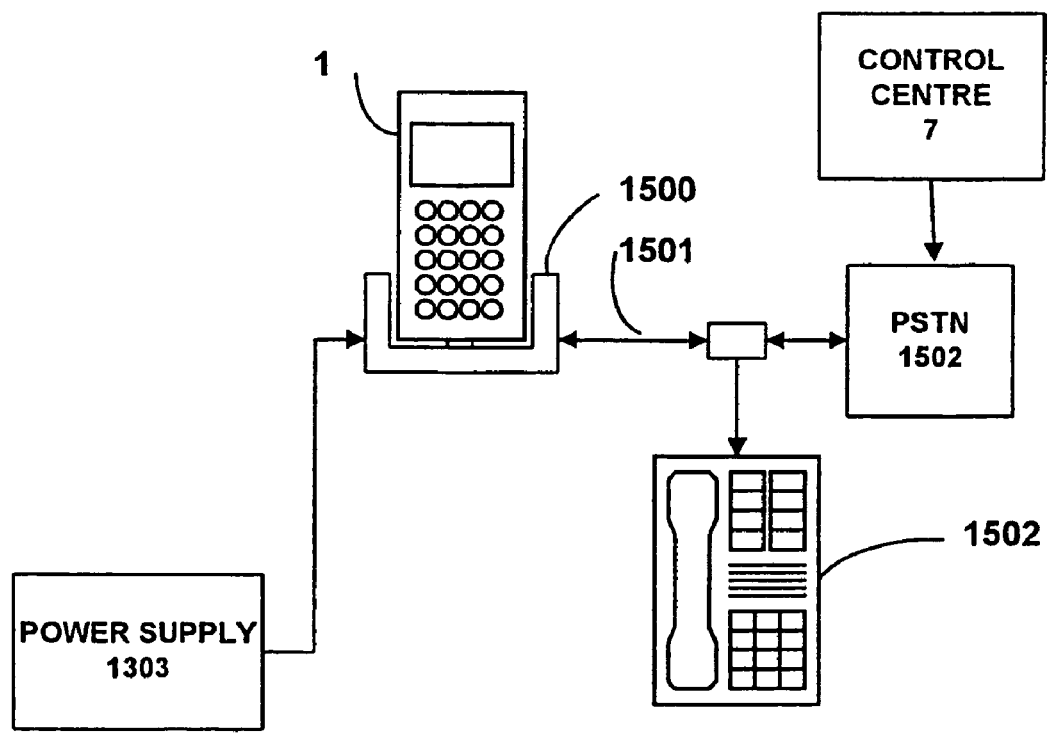
FIG. 15 is a schematic diagram of a further alternative mobile telephone having a docking station for land line telephone updating of the look-up table.

A further alternative embodiment will now be described with reference to FIGS. 15 and 16 using corresponding reference numerals so those of preceding figures where appropriate for corresponding elements. The mobile telephone 1 of FIG. 15 is similarly provided with a docking station 1500 to which it is detachably connectable, the docking station 1500 providing connection with a telephone line 1501 to a local exchange of the public service telephone network 1502. A conventional telephone set 1502 is also shown connected to the line 1501.

Figure 16:
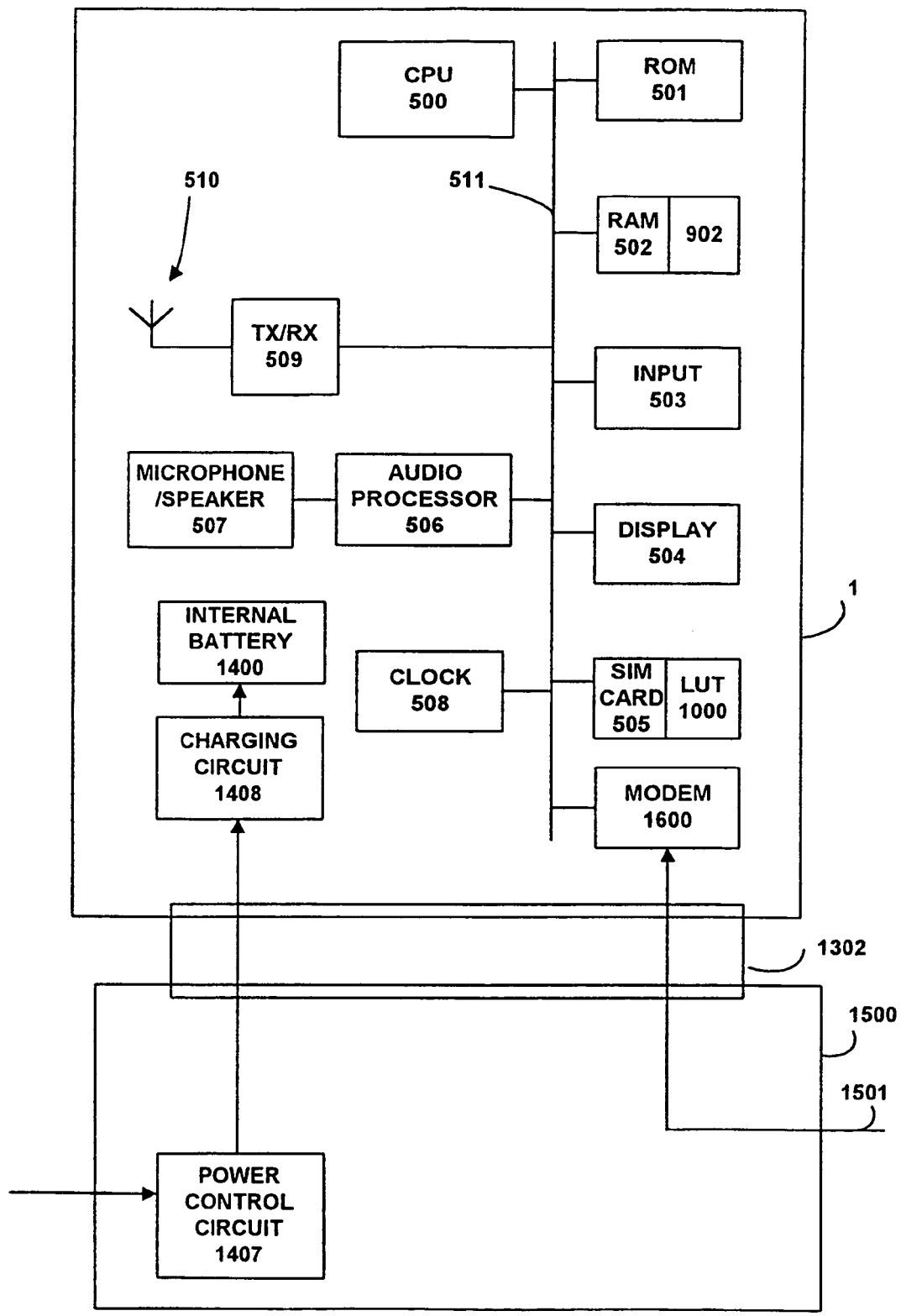
FIG. 16 is a schematic circuit diagram of the mobile telephone and docking station of FIG. 15.

The docking station 1500 is also connected to receive power from a power supply 1303 and, as shown schematically in FIG. 16, communicates charging current to a charging circuit 1408 of the mobile telephone 1 via a control circuit 1407.

The mobile telephone 1 of FIG. 16 includes a modem 1600 which is connected to the telephone line 1501 via the connector 1302 when the mobile telephone 1 is coupled to the docking station 1500.

In order to update the look-up table 1000, an outgoing call is initiated by user actuation of the mobile telephone 1 using the modem 1600 to the control centre 7 requesting a transmission of updating information. The mobile telephone 1 may be provided with a menu of functions for operating the mobile telephone and the initiation of a telephone call request to the control centre 7 for updating the LUT may then be included as one of the available functions accessed via the keypad 503. The control centre 7 responds by transmitting an encoded updating message received by the modem 1600 and processed by the CPU 500 to update the information contained in the look-up table 1000 in a manner described above.

After charging the internal battery 1400 and updating of the look-up table 1000, the mobile telephone 1 is detached from the docking station 1500 for normal use.

Figure 17:
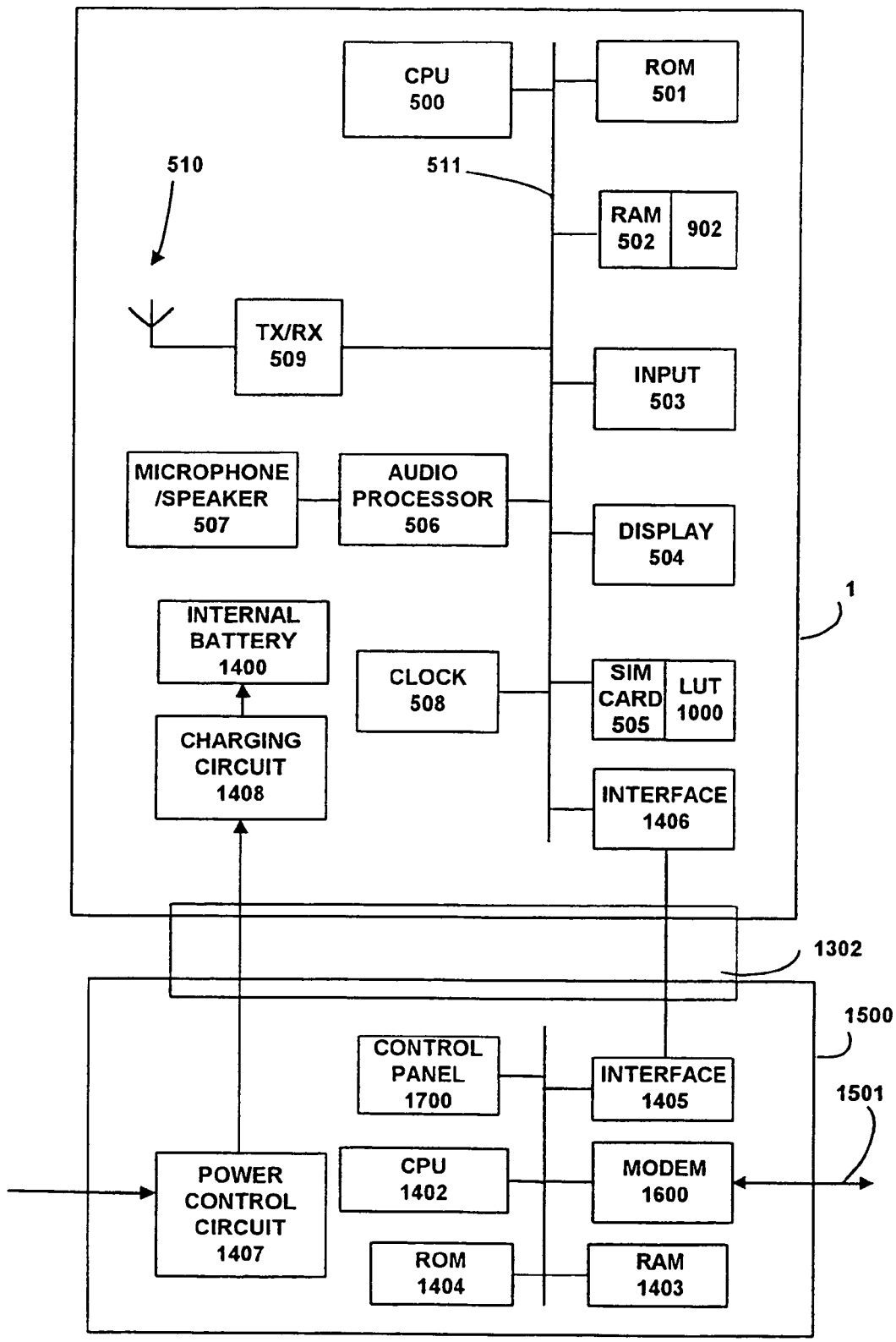
FIG. 17 is a schematic diagram of a further alternative mobile telephone having a docking station for land line telephone updating of the look-up table and in which the docking station includes a modem.

A further alternative embodiment is illustrated in FIG. 17 which will now be described using corresponding reference numerals to those of preceding Figures where appropriate.

In FIG. 17, a mobile telephone 1 is detachably connected to a docking station 1500, electrical connection being made using a connector 1302 for supplying power to a charging circuit 1408 and communicating data via an interface 1406 of the mobile telephone and a cooperating interface 1405 of the docking station.

The docking station 1500 also includes a modem 1600 connected to a telephone line 1501 which, in a similar manner to the arrangement of FIG. 15, is connected to the public service telephone network 1502. The docking station 1500 includes a processor 1402, RAM 1403 and ROM 1404 as well as a control panel 1700 allowing a user to initiate a telephone call from the docking station to the control centre 7. The processor 1402 controls the outgoing call to include an encoded request to receive from the control centre 7 a transmission of updating information for the look-up table 1000. The control centre 7 responds by transmitting blocks of updating information which are received via the modem 1600 and stored in RAM 1403 by the processor 1402. The data is transmitted between the interfaces 1405 and 1406 and stored in the buffer memory 902 within RAM 502 of the mobile telephone 1. The processor 500 of the mobile telephone 1 then uses the data held in buffer memory 902 to update the look-up table 1000 within the SIM card 505 by over-writing existing data at corresponding addresses.

The above process typically requires that the mobile telephone 1 should be turned on and connected to the docking station 1500, following which the user actuates the control panel 1700. After the updating information has been downloaded from the control centre 7, the control centre signals completion of the transmission and the telephone call is terminated. The user is therefore required periodically to remember to utilise the docking station 1500 and to actuate the control panel 1700 to receive updating information. Since, however, the docking station 1500 also allows charging current to be communicated to the charging circuit 1408 for charging the internal battery 1400, the user will routinely utilise the docking station for the purpose of charging the battery and at the same time be reminded to refresh the data in the look-up table.

The CPU 500 may alternatively be programmed to periodically cause a prompting message to be generated to remind the user, the message being displayed using the display 504.

Figure 18:
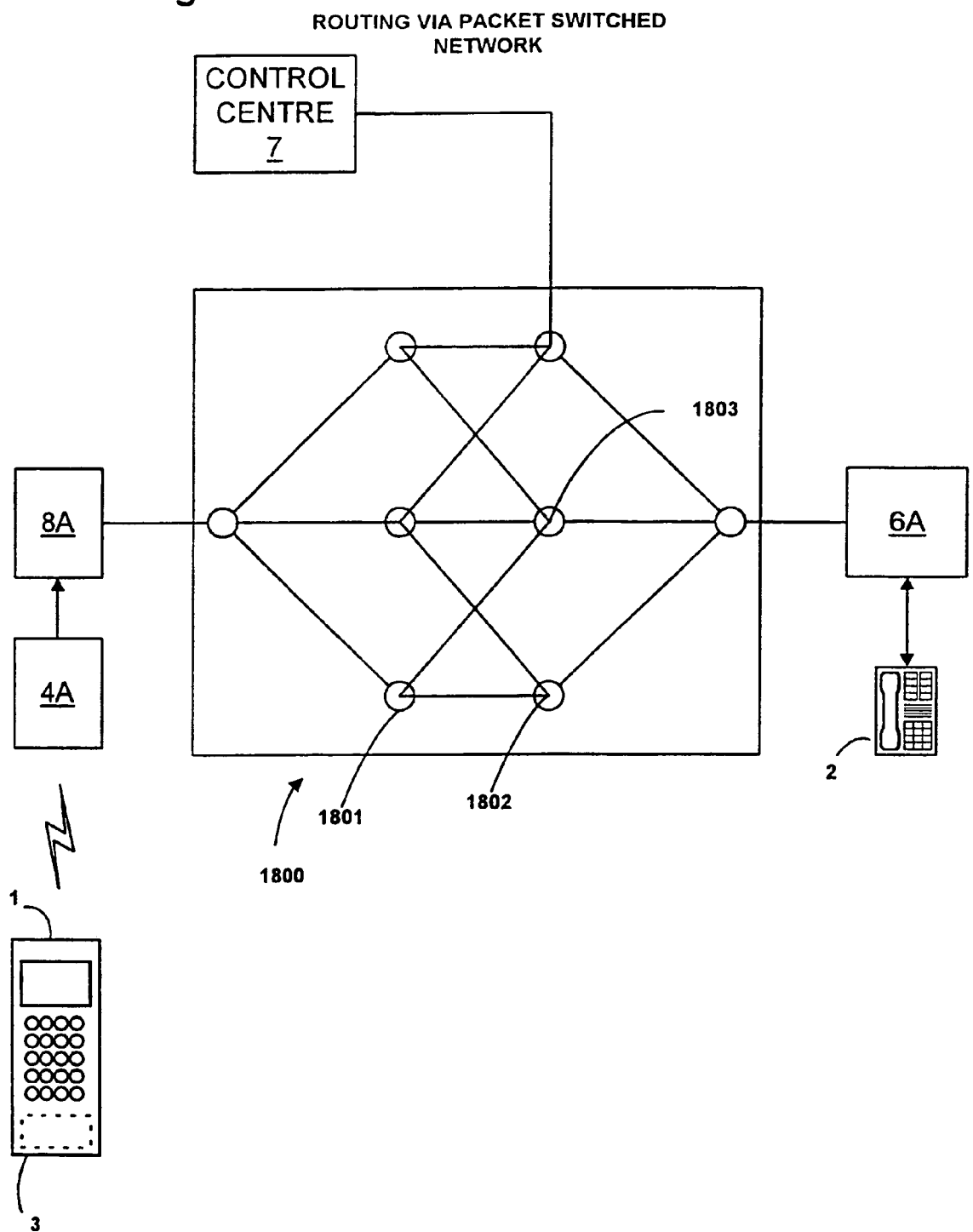
FIG. 18 is a schematic diagram of a further embodiment in which routing is effected via a packet switched network.

FIG. 18 illustrates a further embodiment in which a call from mobile telephone 1 is routed to a destination telephone 2 via a packet switched network 1800 which routes calls between cellular mobile telephone network 8A and local exchange 6A. By analogy with the example of FIG. 1, the mobile telephone 1 communicates with base station 4A via a channel selected as in the case of previous embodiments and in accordance with a selected preferred route code obtained by accessing a look-up table within the mobile telephone. In the present embodiment, the route code further defines the manner in which the packet switched network routes the call by defining a string of network addresses. This information is contained in the transmitted packets of information and is read by the switching nodes of the network.

In the example of FIG. 18, the string of network address codes includes network addresses for nodes 1801 and 1802. Since the switching nodes of the network may be operated by different service providers, the cost of call connection may be determined by a sum of charges from the respective service providers. The string of network addresses thereby enables an optimum or least cost route to be defined.

The string of network addresses may similarly include specific addresses which are to be avoided in the selected route. In a further example therefore, if network node 1802 is referred to in the string of network addresses as an address to be avoided, the preferred route including network node 1801 might be diverted via node 1803 to avoid node 1802.

The manner in which route selection is performed by switching nodes of the network may also be influenced by the network address of the originator of the call. This information is embedded in the packetised data and read by the switching node. The present embodiment also includes the facility for embedding source address information in the packetised data which indicates the origin of the call as being a predetermined network node which may be selected to in fact be different from the actual origin. This technique, known as "masquerading" the network address of origin, may be useful in achieving optimum network switching.

The source address information is therefore included in the look-up table and forms part of the preferred route code obtained by accessing the look-up table.

Figure 19:
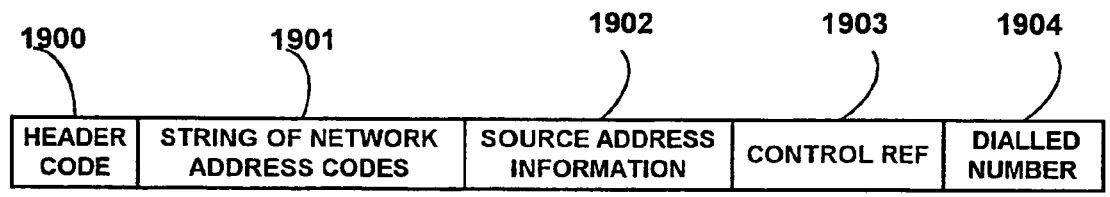
FIG. 19 is a schematic diagram of a prefix code embedded in packetised data.

FIG. 19 illustrates schematically the prefix code which may be included in such packetised data and which analogous to the prefix code of FIG. 4. In FIG. 19, the prefix code to be included in the packetised data is seen to comprise a header code 1900, a string of network address codes 1901, the source address information 1902, control reference information 1903 and details of the dialled number 1904. The control reference 1903 contains information enabling appropriate network service providers to forward billing information to the control centre 7 for costs associated with making the call. The user may thereby be ultimately billed by the control centre 7 for at least some of the services provided by the network service providers.

As indicated above with reference to FIG. 11, network status data obtained from network service providers may be broadcast and stored in the look-up table to provide information on the status regarding performance and availability of switching nodes of the packet switch network 1800. This information is utilised during the route selection procedure, thereby enabling the resulting string of network addresses to be defined so as to avoid specific network nodes or alternatively to ensure that the call is routed via a specific node, thereby taking advantage of the intelligence provided by the network nodes themselves.

The information provided by the control centre and downloaded into the look-tables remains the primary source of information determining the selection of preferred route, the information provided by the network nodes themselves providing an additional layer of support and enhancement to the route selection process.

Figure 20:
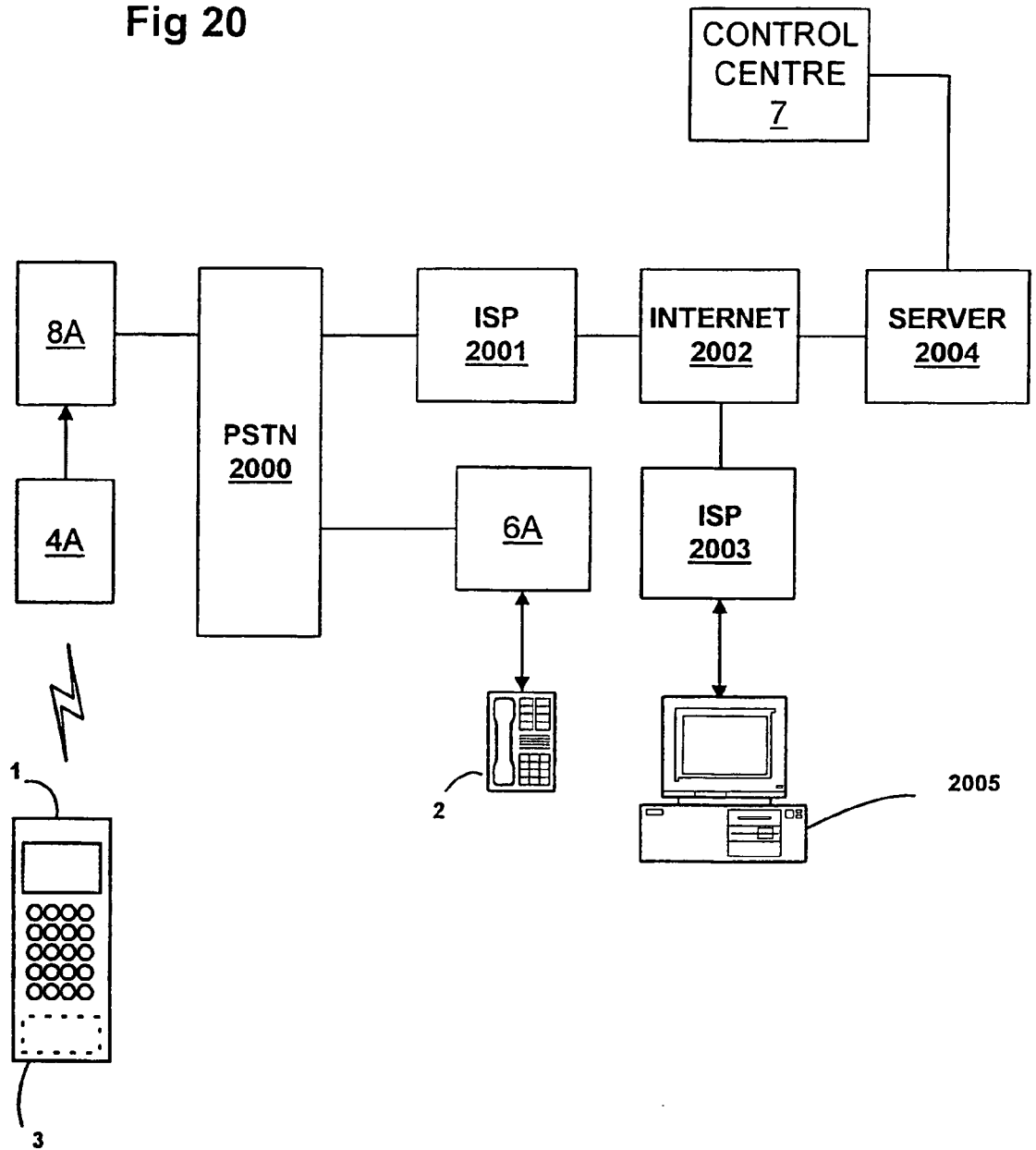
FIG. 20 is a schematic diagram illustrating routing of a call via the Internet and the updating of the look-up table using web pages.

FIG. 20 illustrates the manner in which updating information for updating the look-up table may be obtained in the form of web pages. In the example of FIG. 20, connection is illustrated between a mobile telephone 1 and a destination telephone 2 via the public service telephone network 2000 and local exchange 6A. An Internet service provider 2001 is shown connected to the public service telephone network 2000 so as to be accessible to the mobile telephone 1 by dialling the telephone number of the Internet service provider. The Internet service provider 2001 provides access to the Internet 2002 so that the mobile telephone 1 may gain access to a server 2004 operated by the control centre 7 by outputting the URL (Uniform Resource Locator) of the server as a network address for a request for updating information. In response to such a request for updating information, the server 2004 outputs data in an Internet protocol format defining a web page which is transmitted to the mobile telephone 1 and the relevant updating information extracted and stored in the manner described above.

FIG. 20 also illustrates an example of a call made by the mobile telephone 1 to a communications device other than a conventional telephone and in this example comprising a personal computer 2005 which includes a modem. Connection to the personal computer 2005 is made via the public service telephone network 2000 and Internet service provider 2001 which provides access to the Internet 2002. The URL or network address of a further Internet service provider 2003 provides connection with the personal computer 2005. Data in a variety of formats may be communicated between the mobile telephone 1 and the personal computer 2005. For this purpose, the mobile telephone 1 may have integrally provided the necessary processing apparatus for inputting and outputting such data or alternatively the mobile telephone 1 may be temporarily connected to an additional processor such as a personal computer, facsimile machine or organiser using a cable connection or infrared link or the like. The current trend however is for the mobile telephone 1 to be unitarily provided with a variety of data processing facilities and for the mobile telephone 1 to include an organiser function or a processor with capabilities approaching those of a personal computer. As such, the term "mobile telephone" is to be construed broadly to include such alternative forms of wireless communications devices usable with cellular networks.

As indicated above, the choice of preferred route may depend upon the data format of the call and defines one of the parameters by which the look-up table is addressed in order to obtain the preferred route. The route may thereby be optimised to be appropriate to the type of data in terms of bit rate and immunity from errors or other performance criteria since for example the transmission of image data requires greater bandwidth and lower error tolerance than voice signal communication where real time capability is of more importance and lower bandwidth can be tolerated.

Figure 21:
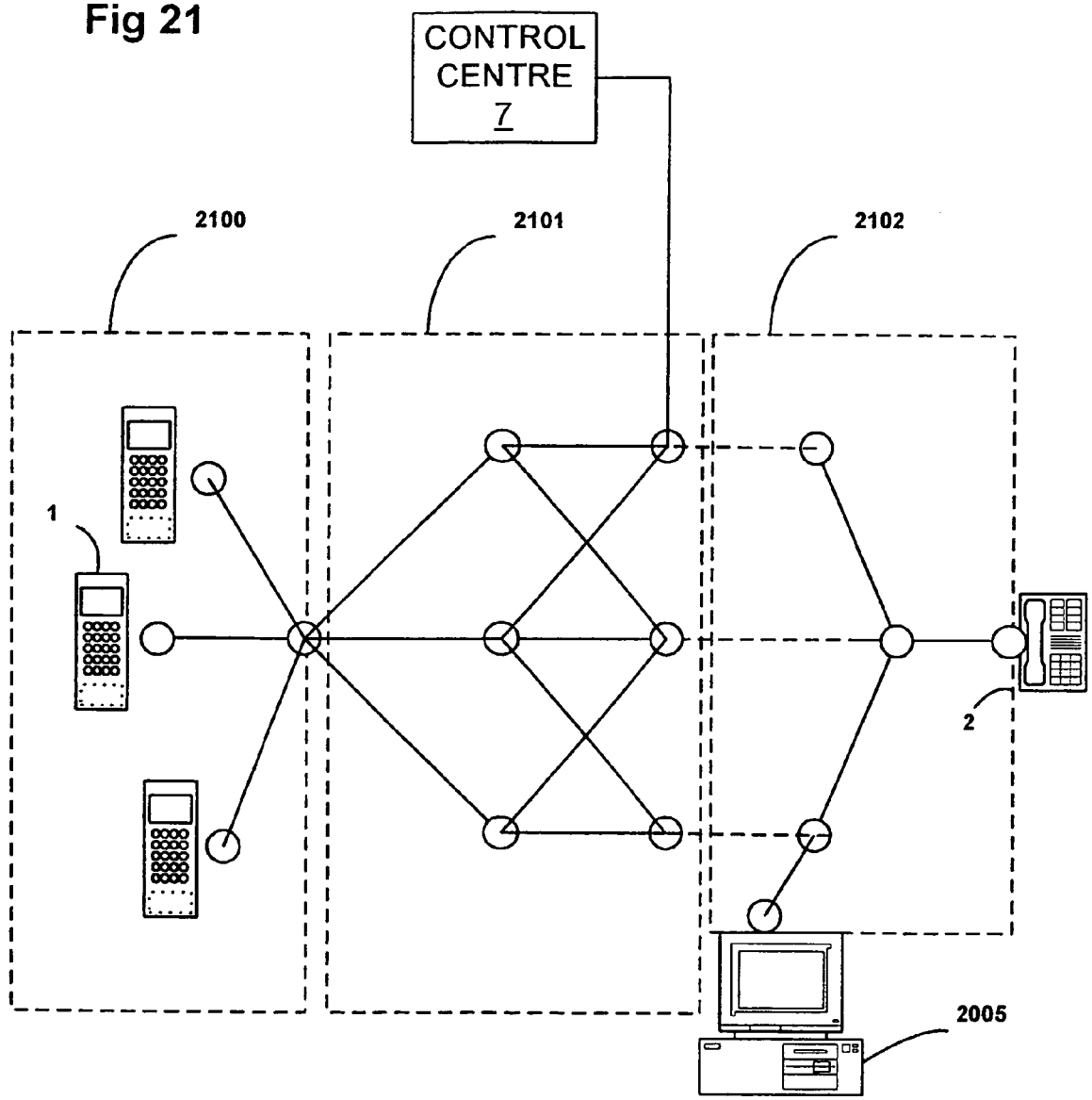
FIG. 21 illustrates schematically the routing of a call via a network system formed as an integrated packet switch network.

FIG. 21 illustrates schematically the manner in which the present invention has application to communication systems in which packet switching techniques are universally applied. In FIG. 21, a packet switching network includes a region 2100 which corresponds to the cellular network systems referred to above and including an air interface, each of a number of mobile telephones 1 constituting nodes of the packet switching network. A further region of the network 2101 may be constituted either by the public service telephone network or the Internet or a combination thereof and a remaining portion 2102 provides local connection to a telephone 2 and PC 2005. The portion 2102 may for example be a cable network or another form of network which is equivalent in effect to the local exchange 6 of the embodiment of FIG. 1.

In a packet switched network such as illustrated in FIG. 21, the notion of a dialled telephone number may be replaced by a network address such as a URL. Alternatively, the destination of a call may be defined using either a telephone number or URL depending on the nature of the destination and the type of data to be transmitted.

Figure 22:
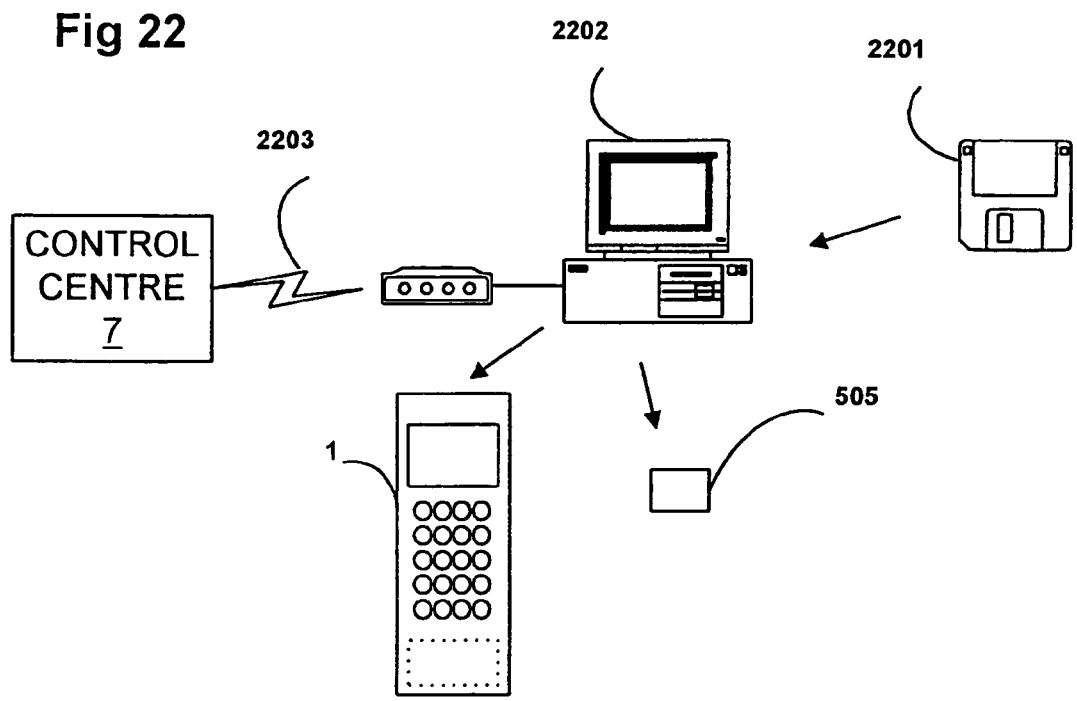
FIG. 22 illustrates schematically the manner in which program code in input tot he mobile telephone in accordance with the present invention and the manner in which a SIM card is provided with a look-up table prior to installation in the mobile telephone.

FIG. 22 illustrates schematically the manner in which the mobile telephone 1 may be programmed such that the processor 500 is provided with program code for carrying out the method of call routing described in the above embodiments. The code may be initially stored in a portable storage medium 2201 which is processed in a manufacturing processor 2202 to produce telephone 1 in which the processor 500 is provided with the necessary code in ROM or RAM. The processor 2202 may receive alternatively the required code from the control centre 7 via a communications channel as a communications signal 2203.

A SIM card 505 may similarly be programmed by the processor 2202 so as to include an initial set of data constituting the look-up table 900. The SIM card 505 may be assembled with the mobile telephone 1 prior to shipping to a customer or may alternatively be separately despatched for insertion at the point of sale.

Although in the described embodiments communication has been described as occurring between a mobile telephone 1 and a telephone 2, the terminal destination may alternatively be any form of telecommunications apparatus, for example a facsimile machine or computer modem, a combination of telephone with radio, alarm clock, answering machine and the like. Alternatively the telephone 2 may be a private exchange such as private automatic branch exchange (PABX) or a network signal router. Similarly, the mobile telephone 1 may be any form of mobile cellular terminal and the above embodiments should be broadly construed accordingly. The communications signals communicated via telephone calls in the embodiments described herein may be in analogue or digital form and may be representative of voice messages, image data or other forms of data such as HTML.

In FIG. 1 the local exchanges 6A, 6B, 6C are shown separate from the networks 5A, 5B, 5C. However, the local exchanges 6 may also form part of a network.

Although in this embodiment the control centre 7 is connected to the networks 5A, 5B, 5C via the public service telephone network so that the networks 5A, 5B, 5C can transmit billing information to the control centre 7, alternatively the billing information may be sent by any other suitable link, for example a satellite link which does not form part of the networks 5A, 5B, 5C. Different networks 5A, 5B, 5C may send their billing information to the control centre 7 by different ways.

It will be appreciated that the teaching of the described embodiments may be applied to other GSM-based mobile telephone networks or Code Division Multiple Access (CDMA) based networks. An example of a suitable mobile phone network is the Personal Handyphone System (PHS).

The embodiment referred to above with reference to FIG. 13 includes a cable network 1301 as a means of communicating a multi-point broadcast. Other broadcasting networks may alternatively be utilised, including for example a satellite television network or the Internet, provided that the decoder 1305 of FIG. 13 is replaced by an appropriate means of decoding the broadcast information.

In any of the embodiments described herein which receive updating information via a channel of a mobile telephone cellular network, as for example described with reference to FIGS. 1 to 12, the mobile telephone 1 may be configured to receive web pages by means of signals encoded using WAP (Wireless Application Protocol) or any equivalent version of HTML (HyperText Markup Language). For such mobile telephones, the updating information for updating the look-up tables may be downloaded to the mobile telephone in the form of a web page. The mobile telephone 1 in this instance may be configured such that the processor 500 periodically generates a request for a web page by signalling to the URL (Uniform Resource Locator) of the control centre 7 which responds by downloading the web page. The web page may be displayed by the display 504 of the telephone 1 or alternatively the processor 500 may be programmed to recognise such web pages and store the received information without displaying the web page.

The received information may be processed and the updating information stored in buffer memory 902 prior to updating the look-up table 900 as described above with reference to FIG. 9.

Such an embodiment requires that the processor is provided with a browser program and a program enabling received information in the form of WAP to be converted to data which may be written to the look-up table 900. In the described embodiments, after selection of a channel to provide transmission via the air interface 9, the data contained in the look-up tables determines subsequent routing over networks selected from a plurality of available networks 5A, 5B and 5C for example as shown in FIG. 1. It may however be appropriate for the control centre 7 to populate the look-up tables with data which requires that a single one of the networks, such as a selected network 5A, is always utilised when routing calls. This may be appropriate for example where the service provider of the selected network 5A also controls the control centre 7.

In the above described embodiments with reference to FIG. 4, the dialling information conforms to the 1xxx standard wherein the first digit is "1" followed by a number "1xxx" (network reference 50). Alternatively, other network access methods may be utilised such as for example the 0800 prefix currently used for freephone telephone numbers.

In the described embodiments, a routing decision based on least cost for a telephone call connected via a conventional network will generally compare call costs for different routes on the basis of cost per unit time, e.g. cost per minute. Alternatively, when connection is made via a digital network, and in particular a packet switched network, it will be more appropriate for a routing decision to be based on capacity pricing such as a cost per kilobyte of data. Both of the above comparisons are to be taken as falling within the meaning of least cost routing in accordance with the present invention.

The invention claimed is:

1. A method of operating a mobile telephone in a cellular telephone communications system including a plurality of mobile network service providers and a plurality of land line network service providers, the method comprising:

storing preferred route codes in a look-up table of the mobile telephone, each preferred route code identifying a mobile network service provider and a land line network service provider to be used to route a call to a corresponding call destination and based on results of a route selection decision by a control centre remote from the mobile telephone;

originating an outgoing telephone call to a call destination by the input of user generated call destination information;

accessing the look-up table using an address determined at least in part by the user generated call destination information to obtain a selected preferred route code that corresponds to the call destination;

selecting a communication channel of the mobile network service provider identified by the selected preferred route code corresponding to the call destination;

transmitting the selected preferred route code via the selected communication channel to establish communication for the outgoing telephone call to the call destination corresponding to the user generated call destination information via the mobile network service provider and the land line network service provider identified by the selected preferred route code; and periodically scanning received transmissions to identify available communications channels for which the mobile telephone has functional capability and attempting to complete a registration procedure for each available channel, wherein said selecting comprises selecting from those available channels of said cellular telephone communications system in respect of which registration is completed.

2. A method as claimed in claim 1 wherein the decision is based at least in part on least-cost.

3. A method as claimed in claim 1 wherein the decision is based at least in part on performance of at least one network selected in accordance with the preferred route.

4. A method as claimed in claim 1 wherein the preferred route codes further determine a choice of a further network for forward connection between a network of the service provider of the selected communication channel and the call destination via the further network.

5. A method as claimed in claim 4 wherein the control centre collates billing information in respect of services provided by the service provider and one or more further service providers of the further networks in facilitating the making of the call to the call destination.

6. A method as claimed in claim 4 wherein the mobile telephone adds a prefix code to the user generated call destination information.

7. A method as claimed in claim 6 wherein the prefix code includes a customer identification field containing user specific identification data.

8. A method as claimed in of claim 6 wherein the prefix code includes a charging information field for identifying a control entity to be billed by one or more service providers corresponding to the selected network connection route.

9. A method as claimed in claim 1 further comprising electing from the available channels a home channel for receipt of incoming calls.

10. A method as claimed in claim 1 further comprising electing from the available channels in respect of which registration is completed an update receiving channel for receipt of updating information broadcasts.

11. A method as claimed in claim 1 wherein the look-up table is stored in a portable storage medium removably installed in the mobile telephone.

12. A method as claimed in claim 11 wherein the storage medium is a smart card.

13. A method as claimed in claim 11 wherein the portable storage medium is a SIM (subscriber identity module) card which also stores subscriber specific data for identification and authentication purposes.

14. A method as claimed in claim 11 wherein the look-up table is populated with an initial set of data before installation of the storage medium in the mobile telephone.

15. A method as claimed in claim 1 further comprising periodically updating the data stored in the look-up table by receiving data blocks each containing a respective portion of updated data and, for each received data block, overwriting a corresponding portion of the existing data with updated data from the received block.

16. A method as claimed in claim 1 wherein the look-up table comprises:

a routing table containing the preferred route codes;

a carrier selection table containing, for each preferred route code, a list in order of priority of carrier selections to be used, subject to availability; and a carrier access table containing, for each carrier selection, a channel selection identifying a communications channel provided by a service provider of the mobile telephone system and a prefix code to be added to the dialed number identifying a further network for routing the call.

17. A method as claimed in claim 16 wherein the look-up table further comprises a carrier availability table containing information indicating which of the channels are currently available.

18. A method as claimed in claim 17 wherein the accessing the look-up table comprises:

addressing the routing table to obtain a preferred route code;

using the preferred route code to address the carrier selection table to obtain a list of carrier selections;

addressing the carrier access table using the first carrier selection on the list to obtain the prefix code and channel selection data for the first channel selection; and addressing the carrier availability table using the channel selection data to determine if the first carrier selection is one of the available channels in respect of which registration is completed and, if so, initiating the call to the call destination using the prefix code via the channel selection data for the first carrier selection.

19. A method as claimed in claim 18 wherein, if the first carrier selection is determined not to be an available channel, the carrier availability table is addressed using channel selection data for a further carrier selection from the list and, if it is determined that the further carrier selection is an available channel, the call is initiated using the prefix code and channel selection data for the further carrier selection.

20. A method as claimed in claim 17 wherein the mobile telephone searches for available communications channels of the cellular telephone communications system and updates the carrier availability table accordingly.

21. A method as claimed in claim 1 wherein the look-up table comprises default route data and wherein if accessing the look-up table with the call destination information fails to locate corresponding data defining a preferred route code, the preferred route code is derived from the default route data.

22. A method as claimed in claim 1 wherein updating information for updating the look-up table is communicated to the mobile telephone via a selected one of the available communications channels.

23. A method as claimed in claim 22 wherein the updating information is transmitted using an SMS (short message service) protocol.

24. A method as claimed in claim 22 wherein the updating information is transmitted as a multipoint broadcast to a plurality of mobile telephones.

25. A method as claimed in claim 1 wherein the updating information is transmitted to the mobile telephone as a web page.

26. A method as claimed in claim 25 wherein the web page is transmitted using Wireless Application Protocol.

27. A method as claimed in claim 25 wherein the mobile telephone processes the web page to extract updating information; stores the extracted updating information in a buffer memory; and updates the look-up table with updating information read from the buffer memory.

28. A method as claimed in claim 1 wherein the updating information is communicated to the mobile telephone by detachably connecting the mobile telephone to a docking station and transmitting the updating information to the mobile telephone via the docking station.

29. A method as claimed in claim 28 wherein the docking station is connected to receive a multipoint broadcast of updating information via a broadcast network.

30. A method as claimed in claim 29 wherein the docking station receives updating information as signals multiplexed in a television transmission signal.

31. A method as claimed in claim 30 wherein the signal is multiplexed in the vertical blanking interval of the television transmission signal.

32. A method as claimed in claim 29 wherein the broadcasting network is an optical cable network.

33. A method as claimed in claim 29 wherein the broadcasting network is a satellite television network.

34. A method as claimed in claim 28 wherein the docking station is connected to a telephone line and updating information is received from the control centre in response to making a telephone call request to the control centre via the telephone line.

35. A method as claimed in claim 34 wherein the docking station comprises a modem connected to the telephone line and which generates the telephone call request in response to user actuation of the docking station.

36. A method as claimed in claim 34 wherein the mobile telephone comprises a modem connected to the telephone line via the docking station and which generates the telephone call request in response to user actuation of the mobile telephone.

37. A method as claimed in claim 28 wherein the mobile telephone comprises an internal battery which is recharged by detachably connecting the mobile telephone to the docking station.

38. A method as claimed in claim 1 wherein the preferred route code determines a route via a packet switched network and comprises network address information defining at least one node of the network which is to be included in the selected route.

39. A method as claimed in claim 38 wherein the network address information defines at least one further node of the network which is not to be included in the selected route.

40. A method as claimed in claim 38 wherein the outgoing telephone call is transmitted as a packetised signal using a protocol in which such signals include a start address indicator interpreted by the network as being representative of a network address from which the call originates and further comprising transmitting the outgoing telephone call including start address information defined by the preferred route code.

41. A method as claimed in claim 40 wherein the start address information is representative of a start address which is different from the actual start address of the outgoing telephone call in the network.

42. A method as claimed in claim 1 wherein the telephone call is originated to communicate data comprising a type of data selected from a set of alternative types of data.

43. A method as claimed in claim 42 wherein the set of alternative types of data comprises voice data, image data and data formatted in accordance with an Internet protocol.

44. A method as claimed in claim 41 wherein the look-up table stores respective preferred route codes for each of the types of data.

45. A method as claimed in claim 1 wherein the cellular telephone system comprises part of a packet switching network in which the mobile telephone constitutes a node of the network and wherein the call destination constitutes a further node of the network.

46. A mobile telephone for use in a cellular telephone communications system including a plurality of mobile network service providers and a plurality of land line network service providers, the mobile telephone comprising:

a look-up table storing preferred route codes each identifying a mobile network service provider and a land line network service provider to be used to route a call to a corresponding call destination and based on results of a route selection decision by a control centre remote from the mobile telephone;

an input section configured to originate an outgoing telephone call to a call destination by the input of user generated call destination information;

an accessing section configured to access the look-up table using an address determined at least in part by the user generated call destination information to obtain a selected preferred route code that corresponds to the call destination;

a channel selector configured to select a communication channel of the mobile network service provider identified by the selected preferred route code corresponding to the call destination;

a communication device configured to transmit the selected preferred route code via the selected communication channel to establish communication for the outgoing telephone call to the call destination corresponding to the user generated call destination information via the mobile network service provider and the land line network service provider identified by the selected preferred route code; and a scanning device configured to periodically scan received transmissions to identify available communications channels for which the mobile telephone has functional capability and attempt to complete a registration procedure for each available channel, wherein the channel selector is operable to perform selection from those available channels of said cellular telephone communications system in which registration is completed.

47. A mobile telephone as claimed in claim 46 further comprising a code generator configured to add a prefix code to the user generated call destination information.

48. A mobile telephone as claimed in claim 47 wherein the prefix code includes a customer identification field containing user specific identification data.

49. A mobile telephone as claimed in claim 47 wherein the prefix code includes a charging information field for identifying a control entity to be billed by one or more service providers corresponding to the selected network connection route.

50. A mobile telephone as claimed in claim 46 further comprising an electing device configured to elect from the available channels in respect of which registration is completed a home channel for receipt of incoming calls.

51. A mobile telephone as claimed in claim 50 wherein the electing device is further operable to elect from the available channels an update receiving channel for receipt of updating information broadcasts.

52. A mobile telephone as claimed in claim 46 wherein the look-up table is stored in a portable storage medium removably installed in the mobile telephone.

53. A mobile telephone as claimed in claim 52 wherein the storage medium is a smart card.

54. A mobile telephone as claimed in claim 52 wherein the portable storage medium is a SIM (subscriber identity module) card which also stores subscriber specific data for identification and authentication purposes.

55. A mobile telephone as claimed in claim 46 further comprising an updating unit configured to periodically update the data stored in the look-up table by receiving data blocks each containing a respective portion of updated data and, for each received data block, overwrite a corresponding portion of the existing data with updated data from the received block.

56. A mobile telephone as claimed in claim 46 wherein the look-up table comprises:
   a routing table containing the preferred route codes;
   a carrier selection table containing, for each preferred route code, a list in order of priority of carrier selections to be used, subject to availability; and
   a carrier access table containing, for each carrier selection, a channel selection identifying a communications channel provided by a service provider of the mobile telephone system and a prefix code to be added to the dialed number identifying a further network for routing the call.

57. A mobile telephone as claimed in claim 56 wherein the look-up table further comprises a carrier availability table containing information indicating which of the channels are currently available.

58. A mobile telephone as claimed in claim 57 wherein the accessing section comprises:
   a first addressing section configured to address the routing table to obtain a preferred route code;
   a selector configured to use the preferred route code to address the carrier selection table to obtain a list of carrier selections;
   a second addressing section configured to address the carrier access table using the first carrier selection on the list to obtain the prefix code and channel selection data for the first channel selection; and
   a third addressing section configured to address the carrier availability table using the channel selection data to determine if the first carrier selection is one of the available channels in respect of which registration is completed and, if so, initiate the call to the call destination using the prefix code via the channel selection data for the first carrier selection.

59. A mobile telephone as claimed in claim 58 wherein, if the first carrier selection is determined not to be an available channel, the third addressing section is operable to address the table using channel selection data for a further carrier selection from the list and, if it is determined that the further carrier selection is an available channel, to initiate the call using the prefix code and channel selection data for the further carrier selection.

60. A mobile telephone as claimed in claim 57 further comprising a searching section configured to search for available communications channels of the cellular telephone communications system and an updating section configured to update the carrier availability table accordingly.

61. A mobile telephone as claimed in claim 46 wherein the look-up table comprises default route data and wherein the accessing section is operable, if accessing the look-up table with the call destination information fails to locate corresponding data defining a preferred route code, to derive preferred route code from the default route data.

62. A mobile telephone as claimed in claim 46 further comprising an extracting section configured to extract updating information for updating the look-up table from signals communicated to the mobile telephone via a selected one of the available communications channels.

63. A mobile telephone as claimed in claim 62 wherein the updating information is extracted from signals encoded using an SMS (short message service) protocol.

64. A mobile telephone as claimed in claim 63 wherein the extracting section is operable to extract the updating information from data transmitted to the mobile telephone as a web page.

65. A mobile telephone as claimed in claim 64 wherein the extracting section extracts updating information from the web page using Wireless Application Protocol.

66. A mobile telephone as claimed in claim 64 wherein the extracting section comprises a processor operable to process the web page to extract updating information; store the extracted updating information in a buffer memory; and update the look-up table with updating information read from the buffer memory.

67. A mobile telephone as claimed in claim 46 further comprising a connecting section operable to detachably connect the mobile telephone to a docking station and an interface configured to receive the updating information transmitted in use to the mobile telephone via the docking station.

68. A mobile telephone as claimed in claim 67 co-operable in use with a docking station connected to a telephone line such that updating information is received from the control centre in response to making a telephone call request to the control centre via the telephone line; wherein the mobile telephone comprises a modem connectable in use to the telephone line via the docking station and which modem is operable to generate the telephone call request in response to user actuation of the mobile telephone.

69. A mobile telephone as claimed in claim 46 wherein the preferred route code determines a route via a packet switched network and comprises network address information defining in use at least one node of the network which is to be included in the selected route.

70. A mobile telephone as claimed in claim 69 wherein the network address information defines in use at least one further node of the network which is not to be included in the selected route.

71. A mobile telephone as claimed in claim 69 further comprising a transmitter configured to transmit the outgoing telephone call as a packetised signal using a protocol in which such signals include a start address indicator interpreted in use by the network as being representative of a network address from which the call originates and transmit the outgoing telephone call including start address information defined by the preferred route code.

72. A mobile telephone as claimed in claim 46 and operable to output communications signals representative of a type of data selected from a set of alternative types of data.

73. A mobile telephone as claimed in claim 72 wherein the types of data comprise voice data, image data and data formatted in accordance with an Internet protocol.

74. A mobile telephone as claimed in claim 72 wherein the look-table stores respective preferred route codes for each of the types of data.

75. A mobile telephone as claimed in claim 74 operable to receive a broadcast of updating information via a broadcast network and further comprising a decoder for decoding signals multiplexed in the vertical blanking interval of a television transmission signal.

76. A mobile telephone as claimed in claim 74 further comprising a receiver configured to receive updating information via a telephone line.

77. A mobile telephone as claimed in claim 76 further comprising a modem.

78. A mobile telephone as claimed in claim 77 further comprising an initiator configured to initiate the generation of a telephone call via the telephone line requesting the transmission of updating information.

79. A storage medium storing computer program instructions, which when executed by a processor, cause the processor to perform a method of operating a mobile telephone in a system including a plurality of mobile network service providers and a plurality of land line network service providers comprising steps of:

storing preferred route codes in a look-up table of the mobile telephone, each preferred route code identifying a mobile network service provider and a land line network service provider to be used to route a call to a corresponding call destination and based on results of a route selection decision by a control centre remote from the mobile telephone;

originating an outgoing telephone call to a call destination by the input of user generated call destination information;

accessing the look-up table using an address determined at least in part by the user generated call destination information to obtain a selected preferred route code that corresponds to the call destination;

selecting a communication channel of the mobile network service provider identified by the selected preferred route code corresponding to the call destination;

transmitting the selected preferred route code via the selected communication channel to establish communication for the outgoing telephone call to the call destination corresponding to the user generated call destination information via the mobile network service provider and the land line network service provider identified by the selected preferred route code; and periodically scanning received transmissions to identify available communications channels for which the mobile telephone has functional capability and attempting to complete a registration procedure for each available channel, wherein said selecting comprises selecting from those available channels of said cellular telephone communications system in respect of which registration is completed.

80. A communications signal comprising processor implementable instructions for carrying out a method of operating a mobile telephone in a system including a plurality of mobile network service providers and a plurality of land line network service providers comprising steps of:

storing preferred route codes in a look-up table of the mobile telephone, each preferred route code identifying a mobile network service provider and a land line network service provider to be used to route a call to a corresponding call destination and based on results of a route selection decision by a control centre remote from the mobile telephone;

originating an outgoing telephone call to a call destination by the input of user generated call destination information;

accessing the look-up table using an address determined at least in part by the user generated call destination information to obtain a selected preferred route code that corresponds to the call destination;

selecting a communication channel of the mobile network service provider identified by the selected preferred route code corresponding to the call destination;

transmitting the selected preferred route code via the selected communication channel to establish communication for the outgoing telephone call to the call destination corresponding to the user generated call destination information via the mobile network service provider and the land line network service provider identified by the selected preferred route code; and periodically scanning received transmissions to identify available communications channels for which the mobile telephone has functional capability and attempting to complete a registration procedure for each available channel, wherein said selecting comprises selecting from those available channels of said cellular telephone communications system in respect of which registration is completed.

* * * * *